(12) United States Patent
Natanzon

(10) Patent No.: US 10,678,751 B2
(45) Date of Patent: *Jun. 9, 2020

(54) DATA PROTECTION AND LONG TERM RETENTION

(71) Applicant: EMC IP Holding Company LLC, Hopkinton, MA (US)

(72) Inventor: Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/992,261

(22) Filed: May 30, 2018

(65) Prior Publication Data

US 2018/0276224 A1 Sep. 27, 2018

Related U.S. Application Data

(63) Continuation of application No. 14/870,093, filed on Sep. 30, 2015, now Pat. No. 9,996,539.

(51) Int. Cl.
*G06F 16/00* (2019.01)
*G06F 16/11* (2019.01)
*G06F 16/27* (2019.01)
*G06F 16/182* (2019.01)
*G06F 16/23* (2019.01)

(52) U.S. Cl.
CPC .......... *G06F 16/128* (2019.01); *G06F 16/182* (2019.01); *G06F 16/2365* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 8,543,609 B1 * | 9/2013 | Natanzon | G06F 3/0605 707/791 |
| 8,725,692 B1 * | 5/2014 | Natanzon | G06F 7/00 707/640 |
| 8,949,560 B1 * | 2/2015 | Blitzer | G06F 9/45533 711/162 |
| 2009/0228533 A1 * | 9/2009 | Reddy | G06F 16/1744 |
| 2012/0330892 A1 * | 12/2012 | Benjamin | G06F 16/184 707/622 |

* cited by examiner

*Primary Examiner* — Son T Hoang
(74) *Attorney, Agent, or Firm* — Krishnendu Gupta; Dorothy Wu Chiang

(57) ABSTRACT

A method, system and computer product, comprising creating a file system on a LUN of a storage array, taking a snapshot of a second LUN at a first point in time, stored on the storage array, creating a file in the file system, and copying the snapshot into the file.

20 Claims, 26 Drawing Sheets

DATA PROTECTION AND LONG TERM RETENTION

CROSS REFERENCE TO RELATED APPLICATIONS

This Application is a Continuation of U.S. patent application Ser. No. 14/870,093 entitled "DATA PROTECTION AND LONG TERM RETENTION" filed on Sep. 30, 2015, the contents and teachings of which are incorporated herein by reference in their entirety.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Storage systems in general, and block based storage systems specifically, are a key element in modern data centers and computing infrastructure. These systems are designed to store and retrieve large amounts of data, by providing data block address and data block content—for storing a block of data—and by providing a data block address for retrieval of the data block content that is stored at the specified address, Storage solutions are typically partitioned into categories based on a use case and application within a computing infrastructure, and a key distinction exists between primary storage solutions and archiving storage solutions. Primary storage is typically used as the main storage pool for computing applications during application run-time. As such, the performance of primary storage systems is very often a key challenge and a major potential bottleneck in overall application performance, since storage and retrieval of data consumes time and delays the completion of application processing. Storage systems designed for archiving applications are much less sensitive to performance constraints, as they are not part of the run-time application processing.

In general computer systems grow over their lifetime and the data under management tends to grow over the system lifetime. Growth can be exponential, and in both, primary and archiving storage systems, exponential capacity growth typical in modern computing environment presents a major challenge as it results in increased cost, space, and power consumption of the storage systems required to support ever increasing amounts of information.

Existing storage solutions, and especially primary storage solutions, rely on address-based mapping of data, as well as address-based functionality of the storage system's internal algorithms. This is only natural since the computing applications always rely on address-based mapping and identification of data they store and retrieve. However, a completely different scheme in which data, internally within the storage system, is mapped and managed based on its content instead of its address has many substantial advantages. For example, it improves storage capacity efficiency since any duplicate block data will only occupy actual capacity of a single instance of that block. As another example, it improves performance since duplicate block writes do not need to be executed internally in the storage system. Existing storage systems, either primary storage systems or archiving storage systems are incapable of supporting the combination of content based storage—with its numerous advantages—and ultra-high performance. This is a result of the fact that the implementation of content based storage scheme faces several challenges:

(a) intensive computational load which is not easily distributable or breakable into smaller tasks, (b) an inherent need to break large blocks into smaller block sizes in order to achieve content addressing at fine granularity. This block fragmentation dramatically degrades the performance of existing storage solutions, (c) inability to maintain sequential location of data blocks within the storage systems, since mapping is not address based any more, and such inability causes dramatic performance degradation with traditional spinning disk systems, (d) the algorithmic and architectural difficulty in distributing the tasks associated with content based mapping over a large number of processing and storage elements while maintaining single content-addressing space over the full capacity range of the storage system.

A number of issues arise with respect to such devices, and it is necessary to consider such issues as performance, lifetime and resilience to failure of individual devices, overall speed of response and the like.

Such devices may be used in highly demanding circumstances where failure to process data correctly can be extremely serious, or where large scales are involved, and where the system has to be able to cope with sudden surges in demand.

SUMMARY

A method, system and computer product, comprising creating a file system on a LUN of a storage array, taking a snapshot of a second LUN at a first point in time, stored on the storage array, creating a file in the file system, and copying the snapshot into the file.

DETAILED DESCRIPTION

Figure 1:
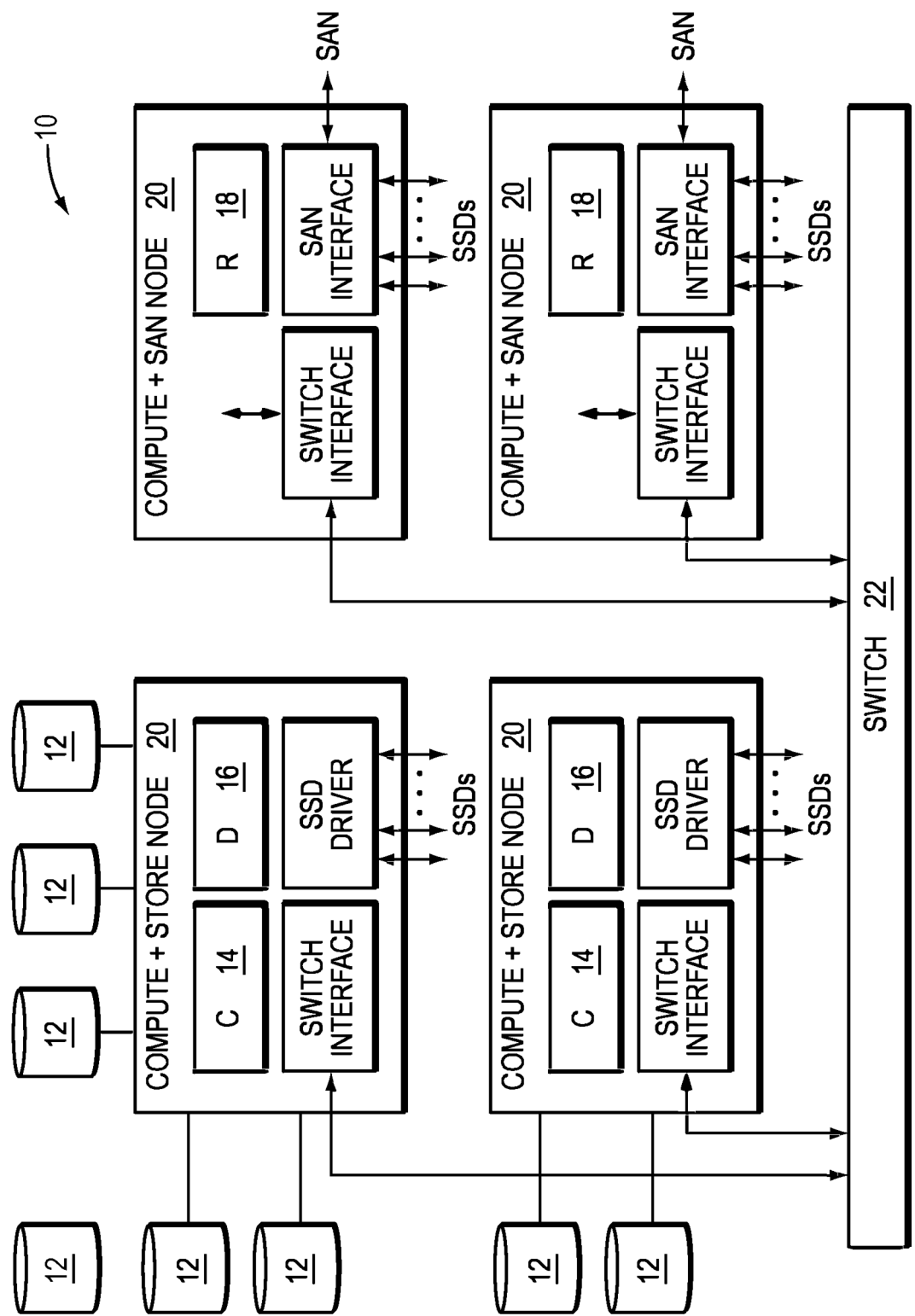
FIG. 1 is a simplified diagram schematically illustrating a system for data storage, having separate control and data planes, in accordance with an embodiment of the present disclosure.

In many embodiments, in deduplicated storage systems, metadata for the storage system may be stored in memory. In certain embodiments, deduplicated storage may have a hash reference count for deduplicated data. In certain embodiments, the current disclosure may enable deduplicated storage to keep back-up copies and long term retention copies of data without taking and storing snapshots, which may increase the amount of metadata stored in memory. In certain embodiments, the current disclosure may enable storing of snapshots in a file system on storage. In most embodiments, the current disclosure may ensure integrity of data that has been backed up.

In certain embodiments, a snapshot may be copied into a file on a file system stored on a LU on the storage system. In most embodiments, the file system may provide data integrity information for the data stored in the file allowing long term retention and integrity of the copy of the snapshot. In certain embodiments, the file system may provide data integrity in separate metadata information. In certain embodiments, a hash tree may be layered over data in a file on a file system. In some embodiments, a hash tree may be layered over a file system with files representing back-ups to ensure data consistency. In certain embodiments, a root hash may be used to describe a back-up. In certain embodiments, a hash tree may be stored in a merkle tree. In many embodiments, by looking at a hash tree it may be possible to determine if data has changed. In certain embodiments, hash indices may map commonality using a variety of techniques. In certain embodiments a Merkle tree may be layered over a file system with files, where the files themselves may consist of hashes. In certain embodiment, when hashes in a back-up file has commonality, a node in a Merkle tree representing the highest point for the commonality may be incremented. In certain embodiments, a root node of an object may be a node that represents the highest point of data commonality mapped by a Merkle tree.

In many embodiments, a tree of hashes may enable detection of a change in the data in the underlying tree. In many embodiments, if one hash in a hash tree changes, it may be possible to determine the corresponding data that changed in the tree. In certain embodiments, it may be possible to clone underlying data by cloning a root hash of a hash tree. In many embodiments, to check the integrity of the data it may be necessary to go through a hash whole tree.

In certain embodiments, the current disclosure may extend capabilities of flash based block storage and allow using the storage as a protection storage allowing efficient storage of multiple similar backup copies of primary data. In some embodiments, the current disclosure may manage multiple devices in a storage system while minimizing metadata use. In some embodiments a flash based storage may be EMC®'s XtremIO®. In certain embodiments, a storage array may have inline deduplication. In many embodiments, a protection storage array may manage a tree of checksums to ensure that data corruption has not occurred. In certain embodiments, a tree of checksums may be layered over a file system to ensure that data corruption has not occurred.

In many embodiments, the current disclosure may leverage storage capabilities and inline deduplication of a storage array, such as a flash storage array. In certain embodiments, a logical unit may be created on a storage array. In some embodiments, the storage array may have inline deduplication. In many embodiments, a file system may be layered over a block storage array on a created logical unit. In certain embodiments, a file system may have signature checks.

In further embodiments, a snapshot of a LUN, LU, or device to be backed-up may be taken. In some embodiments, metadata for a device to be backed up may be created. In certain embodiments, the data corresponding to the device to be backed up may be copied to a created file on a file system. In certain embodiments, data may be copied by an xcopy command. In most embodiments, each address in the address space of a file may maps to the underlying LUN. In certain embodiments, a snapshot may be xcopied into a file. In many embodiments, if xcopy is used there may be a file created in a file system on a LUN with the same data as the snapshot or LUN being copied. In certain embodiments, with xcopy a file with the same size of the LUN may be created and an xcopy command may copy each address of the LUN to the address into a LUN containing the file system which matches the same address as the address in the LUN inside the file. In some embodiments, addresses in a file may be mapped to other addresses in the LU. In many embodiments, xcopy may copy the offset x in the LU to offset x in the file which may be offset Y in the file system LUN. In other embodiments, metadata, such as hashes, corresponding to a LUN may be copied into a file on a file system and an object identifier on a storage array holding a LUN may be incremented. In many embodiments, a storage array may have deduplication and instead of copying data it may be possible to copy a pointer to the data and increment an object reference counter referring to the data. In many embodiments, in data deduplication a piece of redundant data may be stored once and referenced by many pointers. In further embodiments, the number of pointers to a piece of redundant data is tracked and the data may not be deleted until the number of pointers is equal to zero.

In some embodiments, multiple snapshots may be taken of a LU, LUN, or device. In many embodiments, successive snapshots of a device to be backed up may be taken at, a second point in time. In certain embodiments, differences between snapshots at different points in time may be determined. In an embodiment, differences between snapshots may be determined by an API. In most embodiments, differences between snapshots may be stored in one or more files on a file system. In certain embodiments, differences between snapshots may contain the differences from a previous snapshot. In further embodiments, differences between snapshots may be stored as a data file and a metadata file. In still further embodiments, differences between snapshots may be stored in a single file. In some embodiments, data corresponding to differences between snapshots may be data. In other embodiments, data corresponding to differences between snapshots may be a set of pointer. In some embodiments, differentials between snapshots may be xcopied into a file on a file system. In certain embodiments, a file may contain metadata delineating the differences between snapshots. In many embodiments, hierarchy data may be kept for a difference file showing what data changed between snapshots and adding data integrity information.

In almost all embodiments, the file system may keep a hierarchy of checksums for each file corresponding to a snapshot. In many embodiments, for versions or snapshots of a LUN, there may be one or more corresponding files. In certain embodiments, a signature hierarchy may be layered over the files to denote consistency.

In certain embodiments, copying data to a file in a file system on a LUN in a storage array may use the xcopy command. In other embodiments, copying data to a file in a file system on a LUN in a storage array may copy a pointer to the file and increment an object counter on the storage array.

In a particular embodiment, a file system with hash values for each file may be created on a flash array with deduplication. In this particular embodiment a file may be created and the contents of a LUN may be copied into the file. In some embodiments, the file may contain metadata of hashes for data in the LUN and update reference counters to the data. In other embodiments, the file may be created by having the storage xcopy the data from the LUN into the file.

In further embodiments, successive snapshots of backed-up device may be taken. In certain embodiments, a successive snapshot may be compared with the snapshot before it to determine a set of differences between the snapshots. In many embodiments, differences between snapshots may be stored as a file corresponding to the differences and a metadata file denoting whether data for the snapshot is in the previous snapshot or the difference file. In still further embodiments, a snapshot difference file may contain a list of pointers.

In some embodiments, a recovery method for stored snapshots may include creating a recovery LU or LUN. In many embodiments, an xcopy command may be given to copy data in files on a filesystem corresponding to a snapshot into a created LU or LUN. In many embodiments immediate access may be given to a LUN or LU corresponding to a back-up and data may be read from a file system. In most embodiments, a file system for back-ups may be a system for long term retention and may have hashes for the data.

The following may be helpful in understanding the specification and claims:

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators WAN—may be a wide area network that connects local networks and enables them to communicate with one another, such as the Internet.

VIRTUAL VOLUME: may be a volume which is exposed to host by a virtualization layer, the virtual volume may be spanned across more than one site and or volumes VMFS: may be a virtual machine file system, a file system provided by VMware for storing a virtual machine VMDK: may be a virtual machine disk file containing a disk data in a VMFS. Analog to a LUN in a block storage array X-PAGE—A predetermined-size aligned chunk as the base unit for memory and disk operations. Throughout the present description the X-Page size is referred to as having 4 KB, however other smaller or larger values can be used as well and nothing in the design is limited to a specific value.

LUN or LOGICAL UNIT NUMBER is a common name in the industry for designating a volume of data, or a group of data blocks being named with the LUN. Each data block is referred to, by the external user of the storage system, according to its LUN, and its address within this LUN LOGICAL X-PAGE ADDRESS—may be logical address of an X-Page. The address may contain a LUN identifier as well as the offset of the X-Page within the LUN.

LOGICAL BLOCK—may be a 512 bytes (sector) aligned chunk, which may be the SCSI base unit for disk operations.

LOGICAL BLOCK ADDRESS—may be a Logical address of a Logical Block. The logical block address may contain a LUN identifier as well as the offset of the logical block within the LUN.

SUB-LUN—may be a Division of a LUN to smaller logical areas, to balance the load between C modules. Each such small logical area may be referred to herein as a sub-LUN.

SUB-LUN UNIT SIZE—May be a fixed size of a sub-LUN. X-Page Data—Specific sequence of user data values that resides in an X-Page. Each such X-Page Data may be uniquely represented in the system by its hash digest.

D PRIMARY may be a D module responsible for storing an X-Page's Data

D BACKUP—may be a D module responsible for storing a backup for an X-Page Data. The backup may be stored in a non-volatile way (NVRAM or UPS protected).

ACRONYMS:

LXA—Logical X-Page Address.

LB—Logical Block.

LBA—Logical Block Address.

AUS—Atomic Unit Size.

SL—Sub-LUN.

SLUS—Sub-LUN Unit Size.

MBE—Management Back End.

In certain embodiments, the present disclosure may present techniques for encrypting every block once, but still allowing secure access at the volume level. In certain embodiments, a Content Addressable Storage (CAS) array, data may be stored in blocks, for example of 4 KB, where each block may have a unique large hash signature, for example of 20 bytes, saved on Flash memory.

The embodiments described herein may include a networked memory system. In some embodiments, networked memory system may include multiple memory storage units arranged for content addressable storage of data. In many embodiments, data may be transferred to and from the storage units using separate data and control planes. In most embodiments, hashing may be used for content addressing, and the hashing may produce evenly distributed results over the allowed input range. In certain embodiments, hashing may define the physical addresses so that data storage makes even use of the system resources.

In some embodiments, a relatively small granularity may be used, for example with a page size of 4 KB, although smaller or larger block sizes may be selected at the discretion of the skilled person. In most embodiments, a relatively small granularity may enable a device to detach the incoming user access pattern from the internal access pattern. In some embodiments, an incoming user access pattern may be larger than 4 KB or other system-determined page size and may thus be converted to a plurality of write operations within the system, each one separately hashed and separately stored.

In many embodiments, content addressable data storage may be used to ensure that data appearing twice is stored at the same location. In most embodiments, unnecessary duplicate write operations may be identified and avoided. In certain embodiments, avoiding unnecessary duplicate write operations may be by data deduplication. In many embodiments, as well as making the system more efficient overall, reducing unnecessary writes may also increase the lifetime of those storage units that are limited by the number of write/erase operations.

In certain embodiments, a separation of Control and Data may enable a substantially unlimited level of scalability, since control operations can be split over any number of processing elements, and data operations can be split over any number of data storage elements. In most embodiments, control and data separation may allow scalability in both capacity and performance, and may thus permit an operation to be effectively balanced between the different modules and nodes.

In many embodiments, such a separation may also help to speed the operation of the system. In certain embodiments, a separation may speed up Writes and Reads. In most embodiments, the speed up may be due to:

(a) Parallel operation of certain Control and Data actions over multiple Nodes/Modules (b) Use of optimal internal communication/networking technologies per the type of operation (Control or Data), designed to minimize the latency (delay) and maximize the throughput of each type of operation.

In some embodiments, separation of control and data paths may allow each Control or Data information unit to travel within the system between Nodes or Modules in the optimal way, meaning only to where it is needed and if/when it is needed. In certain embodiment, a set of optimal where and when coordinates may not be the same for control and data units, and hence the separation of paths may ensure the optimization of such data and control movements, in a way which may not otherwise be possible. In most embodiments, separation may be important in keeping the workloads and internal communications at the minimum necessary, and may translate into increased optimization of performance.

In certain embodiment, de-duplication of data, meaning ensuring that the same data is not stored twice in different places, may be an inherent effect of using Content-Based mapping of data to D-Modules and within D-Modules.

In many embodiments, scalability may be inherent to an architecture. In certain embodiments, nothing in the architecture may limit the number of the different R, C, D, and H modules which are described further herein. In most embodiments, any number of such modules may be assembled. In certain embodiments, the more modules added, the system performance may become better and the system play be able to handle higher capacity. In most embodiments, scalability of performance and capacity may be achieved.

In certain embodiments, principles and operation of an apparatus and method according to the present invention may be better understood with reference to example embodiments illustrated in the drawings and accompanying description.

Reference is now made to FIG. 1 which illustrates an example embodiment of a system 10 for scalable block data storage and retrieval using content addressing. The system 10 includes data storage devices 12 on which the data, blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control modules 14 may control execution of read and write commands. The data modules 16 are connected to the storage devices and, under control of a respective control module, pass data to or from the storage devices. Both the C and D modules may retain extracts of the data stored in the storage device, and the extracts may be used for the content addressing. Typically the extracts may be computed by cryptographic hashing of the data, as will be discussed in greater detail below, and hash modules (FIG. 2) may specifically be provided for this purpose. That is to say the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10.

The routing modules may use hash values, calculated from data associated with the operations, to select the control module for the distribution. More particularly, selection of the control module may use hash values, but typically relies on the user address and not on the content (hash). The hash value is, however, typically used for selecting the Data (D) module, and for setting the physical location for data storage within a D module.

The storage devices may be solid state random access storage devices, as opposed to spinning disk devices; however disk devices may be used instead or in addition.

A deduplication feature may be provided. The routing modules and/or data modules may compare the extracts or hash values of write data with hash values of already stored data, and where a match is found, simply point to the matched data and avoid rewriting.

The modules are combined into nodes 20 on the network, and the nodes are connected over the network by a switch 22.

The use of content addressing with multiple data modules selected on the basis of the content hashing, and a finely-grained mapping of user addresses to Control Modules allow for a scalable distributed architecture.

The examples described herein to a block-level storage system, offering basic and advanced storage functionality. In some embodiments, a design may be based on a distributed architecture, where computational, Storage Area Networking (SAN), and storage elements are distributed over multiple physical Nodes, with all such Nodes being interconnected over an internal network through a switch device. In some embodiments, a distributed architecture may enable the scaling of the system's capabilities in multiple aspects, including overall storage capacity, performance characteristics in bandwidth and I/O operations per second (IOPS), computational resources, internal and external networking bandwidth, and other. In certain embodiments, while being based on a distributed architecture, a system may present, externally, a unified storage system entity with scalable capabilities.

In some embodiments, a system's architecture and internal algorithms implementing the basic and advanced storage functions may be optimized for improved utilization of the capabilities of random-access memory/storage media, as opposed to contrast with mechanical-magnetic spinning disk storage media. In certain embodiments, optimizations may be implemented in the design itself, and may, for example, include the ability to break incoming writes into smaller blocks and distribute the operation over different Nodes. In some embodiments, an adaptation may be particularly suitable for random access memory/storage media but is less suitable in a spinning-disk environment, as it would degrade performance to extremely low levels. In some embodiments, an adaptation may include content/hash based mapping of data distributes the data over different D Nodes in general and within D Nodes over different SSD devices. In many embodiments, a technique of the current disclosure may be more suitable for random access memory/storage media than for a spinning-disk media because such spread of data blocks would result in very poor performance, in the spinning disk case. In an embodiment, the described elements of the present architecture may designed to work well with random access media, and achieve benefits in performance, scalability, and functionality such as inline deduplication. In some embodiments, random-access memory media may be based on a combination of flash memory, DRAM, phase change memory, or other memory technology, whether persistent or non-persistent, and is typically characterized by random seek/access times and random read/write speeds substantially higher than those exhibited by spinning disk media. In some embodiments, a system's internal data block mapping, the algorithms implementing advanced storage functions, and the algorithms for protecting data stored in the system may be designed to provide storage performance and advanced storage functionality at substantially higher performance, speed, and flexibility than those available with alternative storage systems.

In certain embodiments, data mapping within the system may be designed not only to improve performance, but also to improve the life span and reliability of the electronic memory media, in cases where the memory technology used has limitations on write/erase cycles, as is the case with flash memory. In some embodiment, lifetime maximization may be achieved by avoiding unnecessary write operations as will be explained in greater detail below. In many embodiments, for the purpose of further performance optimization, life span maximization, and cost optimization, the system may employ more than a single type of memory technology, including a mix of more than one Flash technology (e.g., single level cell—SLC flash and multilevel cell—MLC flash), and a mix of Flash and DRAM technologies. In certain embodiment, data mapping may optimize performance and life span by taking advantage of the different access speeds and different write/erase cycle limitations of the various memory technologies.

In some embodiments, a method for mapping blocks of data internally within the system may be based on Content Addressing, and may be implemented through a distributed Content Addressable Storage (CAS) algorithm.

In certain embodiments, blocks of data internally may be mapped according to their content, resulting in mapping of identical block to the same unique internal location. In some embodiments, distributed CAS algorithm may allow for scaling of the CAS domain as overall system capacity grows, effectively utilizing and balancing the available computational and storage elements in order to improve overall system performance at any scale and with any number of computational and storage elements.

In many embodiments, a system may support advanced In-line block level deduplication, which may improve performance and save capacity.

In certain embodiments, elements of the system's functionality may include: Write (store) data block at a specified user address; Trim data block at a specified user address; Read data block from a specified user address; and In-line block level deduplication.

In some embodiments, the following features may be provided: (1) A distributed CAS based storage optimized for electronic random-access storage media; The optimization may include utilizing storage algorithms, mainly the content-based uniformly-distributed mapping of data, that, inherently spread data in a random way across all storage devices. In some embodiments, randomization of storage locations within the system while maintaining a very high level of performance may be preferably achievable with storage media with, a high random access speed; (2) A distributed storage architecture with separate control and data planes; Data mapping that maximizes write-endurance of storage media; System scalability; (3) System resiliency to fault and/or failure of any of its components; (4) Use of multi-technology media to maximize write-endurance of storage media; and (5) In-line deduplication in ultrahigh performance storage using electronic random-access storage media.

In many embodiments, the examples described herein may implement block storage in a distributed and scalable architecture, efficiently aggregating performance from a large number of ultra-fast storage media elements (SSDs or other), preferably with no performance bottlenecks, while providing in-line, highly granular block-level deduplication with no or little performance degradation.

In certain embodiments, a challenge may be to avoid performance bottlenecks and allow performance scalability that is independent of user data access patterns.

In many example embodiments described herein may overcome the scalability challenge by providing data flow (Write, Read) that is distributed among an arbitrary and scalable number of physical and logical nodes. In certain embodiments, a distribution may implemented by (a) separating the control and data paths (the "C" and "D" modules), (b) maintaining optimal load balancing between Data modules, based on the content of the blocks (through the CAS/hashing mechanisms), hence ensuring always balanced load sharing regardless of user access patterns, (c) maintaining optimal load balancing between all Control modules, based on the user address of the blocks at fine granularity, hence ensuring always balanced load sharing regardless of user access patterns, and (d) performing all internal data path operations using small granularity block size, hence detaching the incoming user access pattern from the internal access pattern, since the user pattern is generally larger than the block size.

In certain embodiments, a second challenge may be to support inline, highly granular block level deduplication without degrading storage (read/write speed) performance. In some embodiments, a result may be scalable in both capacity—which is deduplicated over the full capacity space—and performance.

In some embodiments, a solution may involve distributing computation-intensive tasks, such as calculating cryptographic hash values, among an arbitrary number of nodes. In other embodiments, CAS metadata and its access may be distributed among an arbitrary number of nodes. Furthermore, data flow algorithms may partition read/write operations in an optimally-balanced way, over an arbitrary and scalable number of Nodes, while guaranteeing consistency and inline deduplication effect over the complete storage space.

In many embodiments, detaching the data from the incoming pattern, the R-Module may break up any incoming block which is larger than the granularity size across sub-LUNs, sending the relevant parts to the appropriate C-Modules. In certain embodiments, a C-module may be predefined to handle a range or set of Sub-LUN logical addresses. In some embodiments, a C-Module may break up the block it receives for distribution to D-Modules, at a pre-determined granularity, which is the granularity for which a Hash is now calculated. In some embodiments, a result may be that a request to write a certain block (for example of size 64 KB) ends up being broken up into for example 16 internal writes, each write comprising a 4 KB block.

In some embodiments, specific numbers for granularity may be set based on various design tradeoffs, and the specific number used herein of 4 KB is merely an example. In certain embodiments, broken down blocks may be distributed to the D modules in accordance with the corresponding hash values.

In certain embodiments, a challenge may be to address flash-based SSD write/erase cycle limitations, in which the devices have a lifetime dependent on the number of write/erase cycles.

In many embodiments, a solution may involve Inline deduplication to avoid writing in all cases of duplicate data blocks. In certain embodiments, a content (hash) based mapping to different data modules and SSDs may result in optimal wear-leveling, ensuring equal spread of write operations to all data modules and SSDs independently of the user data/address access patterns.

In the following a system is considered from a functional point of view. As described above with respect to FIG. 1, the system 10 is architected around four main functional Modules designated R (for Router), C (for Control), D (for Data), and H (for Hash). Being modular and scalable, any specific system configuration includes at least one of R, C, D, and H, but may include a multiplicity of any or all of these Modules.

Figure 2:
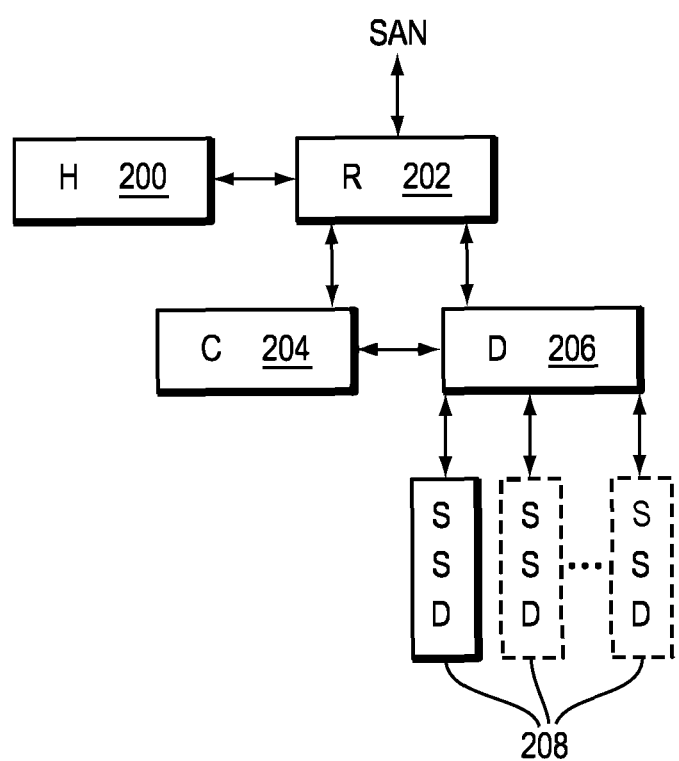
FIG. 2 shows an exemplary configuration of modules for the system of FIG. 1, in accordance with an embodiment of the present disclosure.

Reference is now made to the example embodiment of FIG. 2, which is a functional block diagram of the system in which an H module 200 is connected to an R module 202. The R module is connected to both Control 204 and data 206 modules. The data module is connected to any number of memory devices SSD 208.

A function of the R Module 202 is to terminate SAN Read/Write commands and route them to appropriate C and D Modules for execution by these Modules. By doing, so, the R Module can distribute workload over multiple C and D Modules, and at the same time create complete separation of the Control and Data planes, that is to say provide separate control and data paths.

A function of the C Module 204 is to control the execution of a Read/Write command, as well as other storage functions implemented by the system. It may maintain and manage key metadata elements.

A function of the D Module 206 is to perform the actual Read/Write operation by accessing the storage devices 208 (designated SSDs) attached to it. The D module 206 may maintain metadata related with the physical location of data blocks.

A function of the H Module is to calculate the Hash function value for a given block of data.

Figure 3:
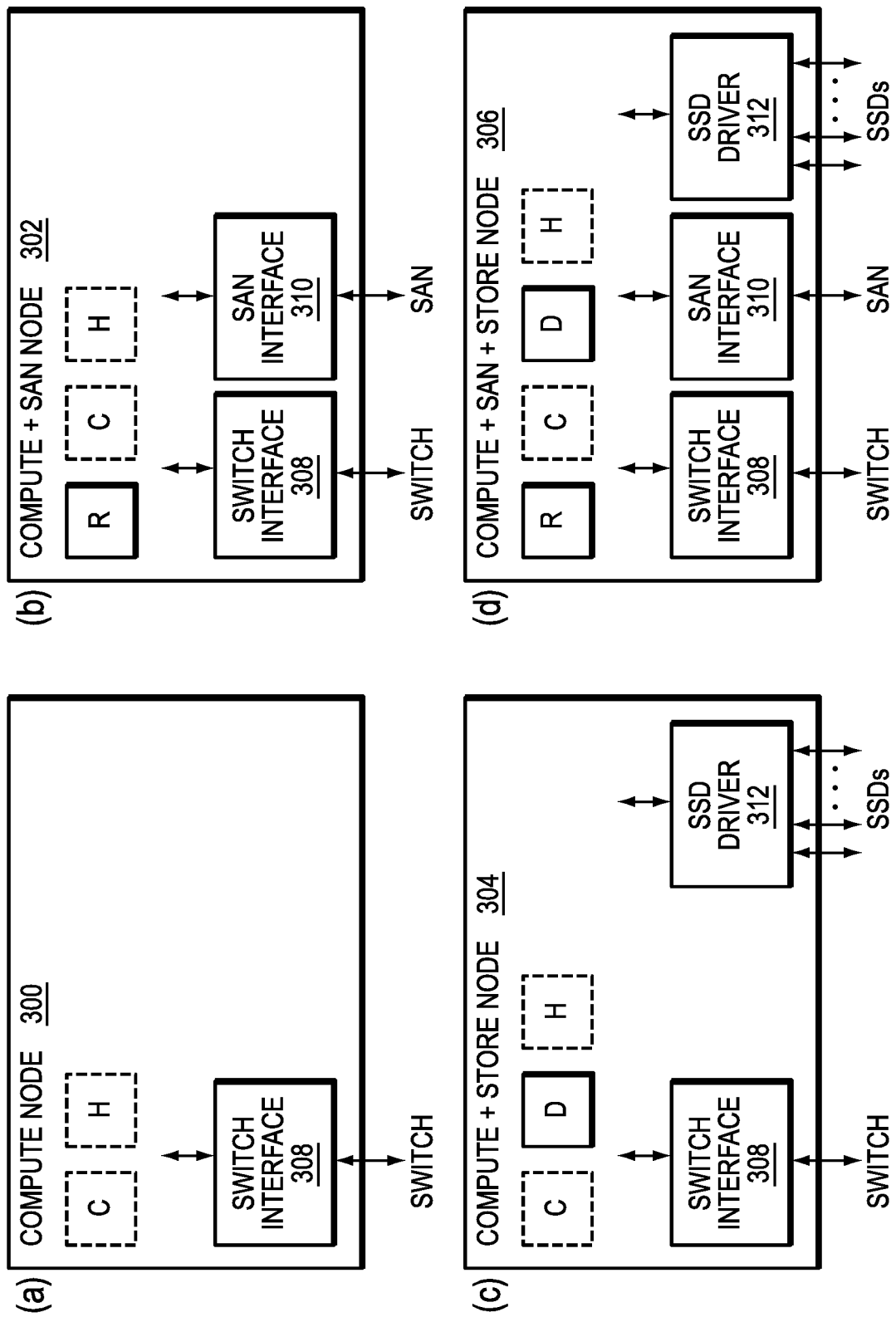
FIG. 3 is a simplified diagram schematically illustrating four different node configurations for the system, in accordance with an embodiment of the present disclosure.

Reference is now made to the example embodiment of FIG. 3, which illustrates nodes. The R, C, D, and H Modules may be implemented in software, and executed on a physical Node. A system includes at least one physical Node, and may include multiple Nodes. There are four possible Node configurations: Compute Node 300, which includes control and hash modules, Compute+SAN Node 302 which includes a router as well as control and hash modules, Compute+Store Node 304, which includes a data module in addition to compute and hash modules, and a Compute+SAN+Store Node 306, which includes all four modules. A system includes a storage area networking or SAN function within at least one Node, and a Store function within at least one Node. The SAN function and the store function can be supported by the same physical Node or any combination of multiple Nodes.

In FIG. 3 each node type shows the functional Modules that execute, in at least one copy, within the Node, and functional Modules that may optionally execute within this Node. Optional Modules are shown in dashed line.

All Nodes include a switch interface 308, to allow interconnecting with a switch in a multi-Node system configuration. A Node that contains a SAN function includes at least one SAN Interface module 310 and at least one R Module. A Node that contains a Store function includes at least one SSD Driver Module 312 and at least one D Module. Hence, Compute+SAN and Compute+SAN+STORE Nodes contain a SAN Interface, to interface with the external SAN. The interface may typically use a SCSI-based protocol running on any of a number of interfaces including Fiber Channel, Ethernet, and others, through which Read/Write and other storage function commands are being sent to the system. Compute+Store and Compute+SAN+Store Nodes contain an SSD driver 312 to interface with SSDs 208 attached to that specific Node, where data is stored and accessed.

Figure 4:
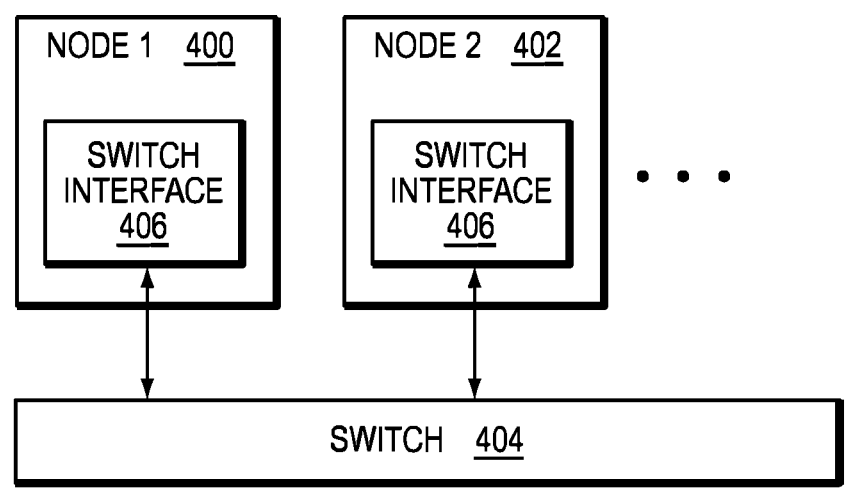
FIG. 4 is a simplified schematic diagram showing the nodes of FIG. 3 connected to a switch, in accordance with an embodiment of the present disclosure.

Reference is now made to the example embodiment of FIG. 4, which shows a high level system block diagram. A system implementation includes one or more Nodes 400, 402. In all cases where a system contains more than two Nodes, all physical Nodes are interconnected by a switch 404 which may be based on any of a number of networking technologies including Ethernet, InfiniBand and so forth. In the specific case of a 2-Node system, the two Nodes can be interconnected directly without a need for a switch.

The interconnections between each Node and the Switch may include redundancy, so as to achieve high system availability with no single point of failure. In such a case, each Node may contain two or more Switch Interface modules 406, and the Switch may contain two or more ports per physical Node.

Figure 5:
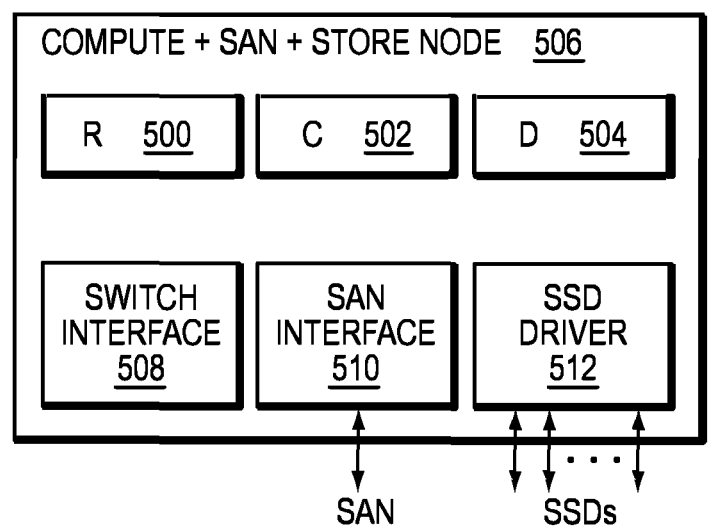
FIG. 5 is a simplified diagram showing a compute+SAN+store node for the device of FIG. 1, in accordance with an embodiment of the present disclosure.

The example embodiment of FIG. 5 illustrates a single Node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four node system configuration is shown in FIG. 1 above. The configuration includes two compute and store nodes and two compute+SAN nodes.

A system that is built from multiple physical Nodes can inherently support a high availability construction, where there is no single point of failure. This means that any Node or sub-Node failure can be compensated for by redundant Nodes, having a complete copy of the system's meta-data, and a complete redundant copy of stored data (or parity information allowing recovery of stored data). The distributed and flexible architecture allows for seamless support of failure conditions by simply directing actions to alternate Nodes.

The R module is responsible for: routing SCSI I/O requests to the C modules, guarantee execution and return the result; and balancing the work load between the C modules for the requests it is routing.

An A->C table indicates which C module is responsible for each logical X-page address (LXA). Each C module is responsible for a list of Sub LUNs (SLs).

The R module receives requests for I/Os from the SAN INTERFACE routes them to the designated C modules and returns the result to the SAN INTERFACE.

If an I/O operation spans across multiple SLs, and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN INTERFACE.

The R module is responsible for maintaining an up-to-date A->C table coordinated with the MBE. The A->C table is expected to balance the range of all possible LXAs between the available C modules.

For write operations, the R module instructs the calculation of the hash digest for each X-Page by requesting such calculation from a Hash calculation module.

The C module is responsible for: receiving an I/O request from an R module on a certain SL, guaranteeing its atomic execution and returning the result; communicating with D modules to execute the I/O requests; monitoring the disk content of its SLs' logical space by associating each LXA with its hash digest; and balancing the work load between the D modules for the SLs it is maintaining.

An H->D table maps each range of hash digests to the corresponding D module responsible for this range.

An A->H table maps each LXA that belongs to the SLs C is responsible for, to the hash digest representing the X-Page Data that currently resides in this address.

The C module receives I/O requests from R modules, distributes the work to the D modules, aggregates the results and guarantees an atomic operation. The result is returned to the R module.

The C module maintains an up-to-date H->D table coordinated with the MBE. The table is expected to balance the range of all possible hash digests between the available D modules.

The C module maintains an A->H table in a persistent way. The C module may initiate 110 requests to D modules in order to save table pages to disk, and read them from disk. To avoid frequent disk operations, a Journal of the latest table operations may be maintained.

Data is balanced between the C modules based on the logical address, at the granularity of sub-LUNs.

The D module is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules, perform them and returning a result.

The D module is also responsible for, for each write operation, backing up the X-Page Data in the designated D backup module and performing read-modify operations for writes that are smaller than X-Page size (This process also involves computing a hash digest for these X-Pages).

The D module is timber responsible for maintaining an up-to-date H->(D, $D_{backup}$) table coordinated with the MBE. The H->(D, $D_{backup}$) table is expected to balance the range of all possible hash digests between the available D modules.

The D module does not communicate directly with R modules. The only interaction with R modules involves RDMA read/write operations of X-Page Data.

Balancing between the D modules is based on hashing of the content.

The D module makes use of a hash digest metadata table. The hash digest metadata table maps each in use hash digest, that represents actual X-Page Data, to its meta data information including its physical page on the storage media (SSD), its memory copy (if exists), a mapping to any backup memory copy and a reference count for the purpose of deduplication.

A further structure used is the H->(D, $D_{backup}$) table. The H->(D, $D_{backup}$) table maps each range of hash digests to the corresponding D module responsible for the range as well as the $D_{backup}$ module responsible for the range.

The D modules allocate a physical page for each X-Page. The D modules also manage the memory for the physical storage. They allocate memory pages for read/write operations and perform background destaging from memory to storage media when necessary, for example, when running low on memory.

The D modules manage a separate nonvolatile memory pool (NVRAM or UPS protected) for X-Page Data backup purposes. The backup holds X-Pages that are held in memory of the D primary and have not yet been destaged. When re-balancing between D modules occur (due to a D module failure for example), the D module may communicate with other D modules in order to create new backup copies or move a primary ownership as required.

The D modules allow deduplication per X-Page Data by maintaining a persistent reference count that guarantees only one copy per X-Page Data. The D modules manage the hash digest metadata table in a persistent way. The table is coordinated with the physical layout for physical pages allocation, with the memory pointer, memory backup pointer and deduplication reference count.

The D modules receive 110 requests from C modules, perform the requests while supporting deduplication and return the result. The D modules may perform RDMA read/write operations on memory that resides in other modules, such as R modules as mentioned above, as part of the I/O operation, When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The H-Module calculates the Hash function of a given block of data, effectively mapping an input value to a unique output value. The Hash function may be based on standards based hash functions such as SHA-1 and MD5, or based on a proprietary function. The hash function is selected to generate a uniformly distributed output over the range of potential input values.

The H modules usually share nodes with an R module but more generally, the H modules can reside in certain nodes, in all nodes, together with R modules, or together with C or D modules.

The following discussion provides high level I/O flows for read, write and trim.

Throughout these flows, unless noted otherwise, control commands are passed between modules using standard RPC messaging, while data "pull" operations may use RDMA read. Data push (as well as Journal) operations may use RDMA write.

The read flow of one X-Page may consist of one R module which receives the read request from the application, one C module in charge of the address requested and one D module which holds the X-Page to be read. Larger, or unaligned, requests may span several X-Pages and thus may involve several D modules. These requests may also span several SLs, in which case they may involve several C modules as well.

Figure 6:
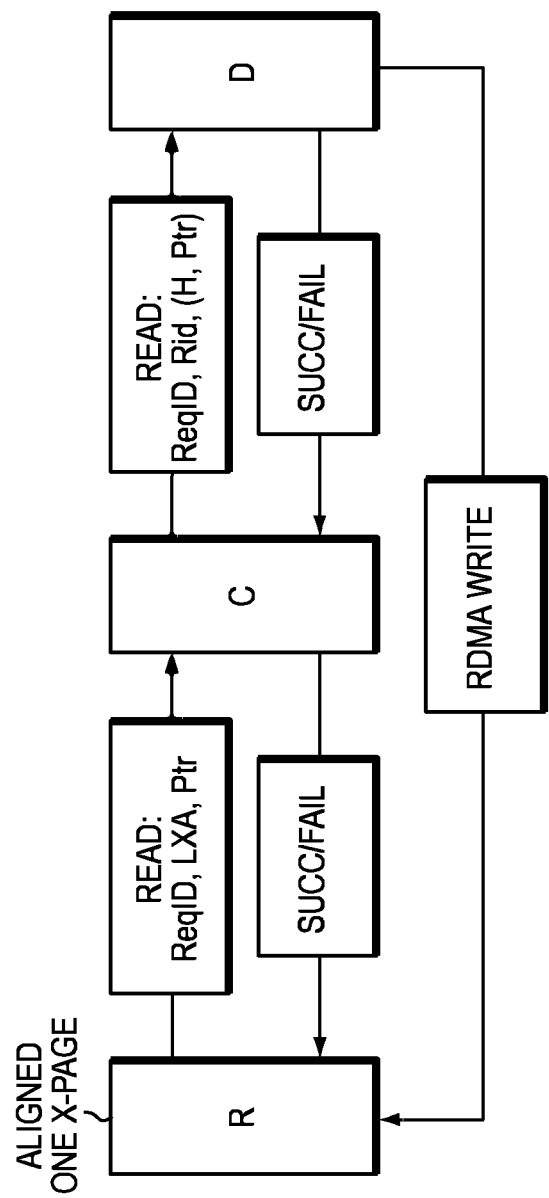
FIG. 6 is a simplified flow chart which illustrates the flow for a read operation for one aligned X-page, in accordance with an embodiment of the present disclosure.

Reference is now made to the example embodiment of FIG. 6 which illustrates the flow for a read operation for one aligned X-page. When the R module receives a read request from an application the R module allocates a request ID for the operation; translates the LBA to LXA; allocates a buffer for the data to be read; consults the A->C component to determine which C module is in charge of this LXA; and sends the designated C module a read request which includes parameters that include a request ID; an LXA; and a pointer to the allocated buffer.

The C module, when receiving the request, consults the A->H component, from which it obtains a hash digest representing the X-Page to be read; consults the H->D component to determine which D module holds the X-Page in question; and sends this D module a read request which includes parameters that include a request ID (as received from the R module), the hash digest, a pointer to the buffer to read to, as received from the R module; and an identifier of the R module.

The D module, when receiving the request, reads the data of the requested X-Page from SSD and performs an RDMA write to the requesting R module, specifically to the pointer passed to it by the C module.

Finally the D module returns success or error to the requesting C module.

The C module in turn propagates success or error back to the requesting R module, which may then propagate it further to answer the application.

Figure 7:
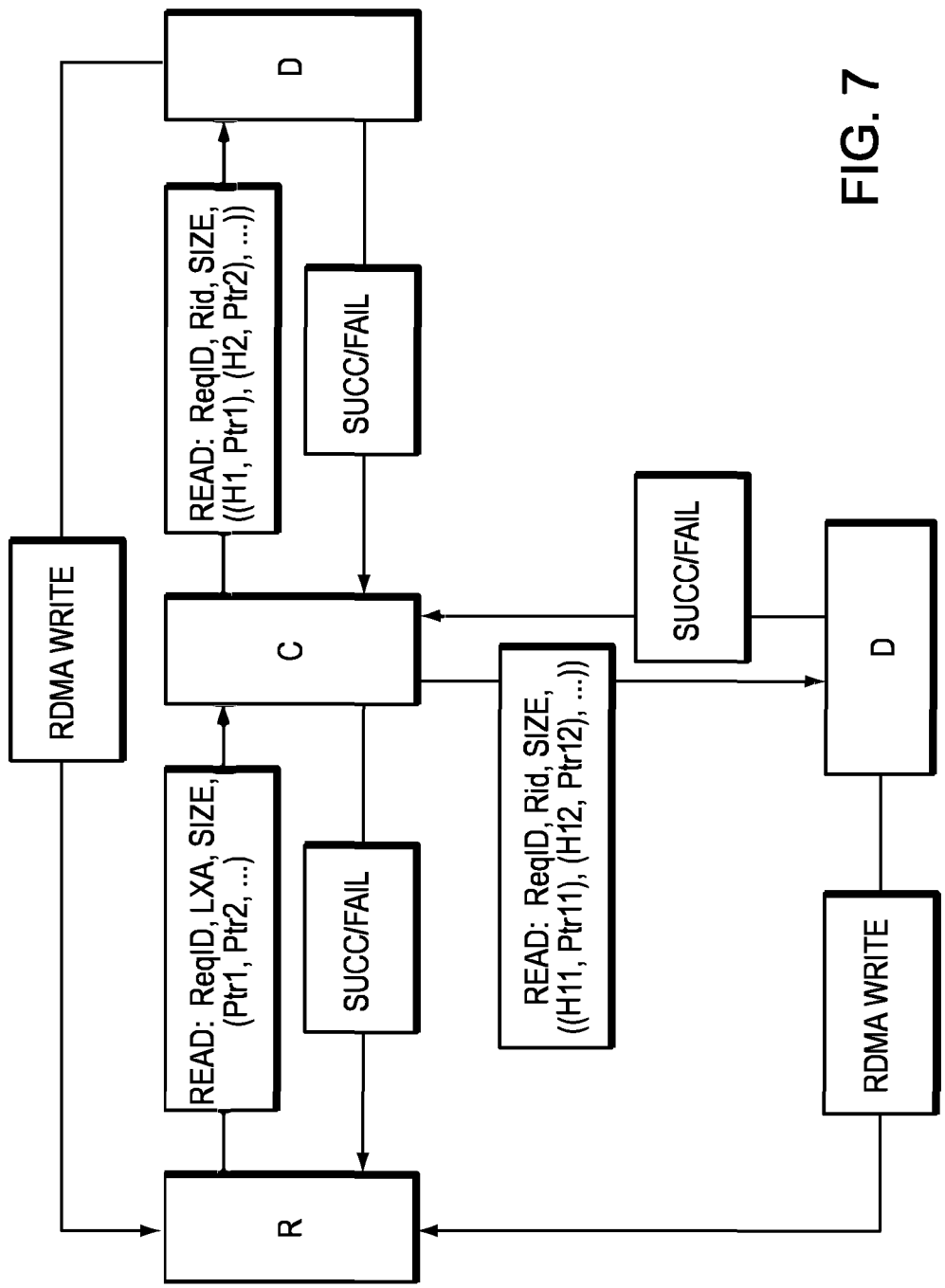
FIG. 7 is a simplified flow chart which illustrates the flow in the event that a read request arrives for a range of addresses spanning more than one X-Page but only one SL, in accordance with an embodiment of the present disclosure.

Reference is now made to the example embodiment of FIG. 7, which illustrates the flow in the case that a read request arrives for a range of addresses spanning more than one X-Page but only one SL. In such a case the R module sends the designated C module a read command with the parameters that include a request ID, first LXA, size of the requested read in X-Pages-n, and n pointers to the allocated X-Page buffers.

The rest of the R module's treatment is identical to the aligned one X-Page scenario previously described herein.

The C module, when receiving the request divides the logical address space to LXAs. For each LXA the C module consults the A->H component to determine the corresponding hash digest; consults the H->D table to determine which D module is responsible for the current LXA; sends each D module a read command containing all the hashes that the respective D module is responsible for. The parameters of the read command include a request ID (as received from the R module); a list of respective hash-pointer pairs; and the identifier of the R module.

Each D module, when receiving the request, acts per hash-pointer pair in the same manner as described above for one X-Page. Aggregated success or error is then sent to the requesting C module.

The C module aggregates all the results given to it by the D modules and return success or error back to the requesting R module, which may then answer the application.

In the case that a read request spans multiple SLs, the R module splits the request and sends several C modules read requests. Each C module may receive one request per SL. The flow may continue as in the simpler case above, except that now the R module aggregates the responses before it answers the application.

Read requests smaller than 4 KB, as well as requests not aligned to 4 KB, may be dealt with at the R module level. For each such parcel of data, the R module may request to read the encompassing X-Page. Upon successful completion of the read command, the R module may crop the non-relevant sections and return only the requested data to the application.

The write flow of one X-Page may consist of one R module which receives the write request from the application, one C module in charge of the address requested and three D modules: $D_{target}$ which is in charge of the X-Page Data to be written (according to its appropriate hash digest), $D_{old}$ which was in charge of the X-Page Data this address contained previously ("old" hash digest), and $D_{backup}$ in charge of storing a backup copy of the X-Page Data to be written.

Figure 8:
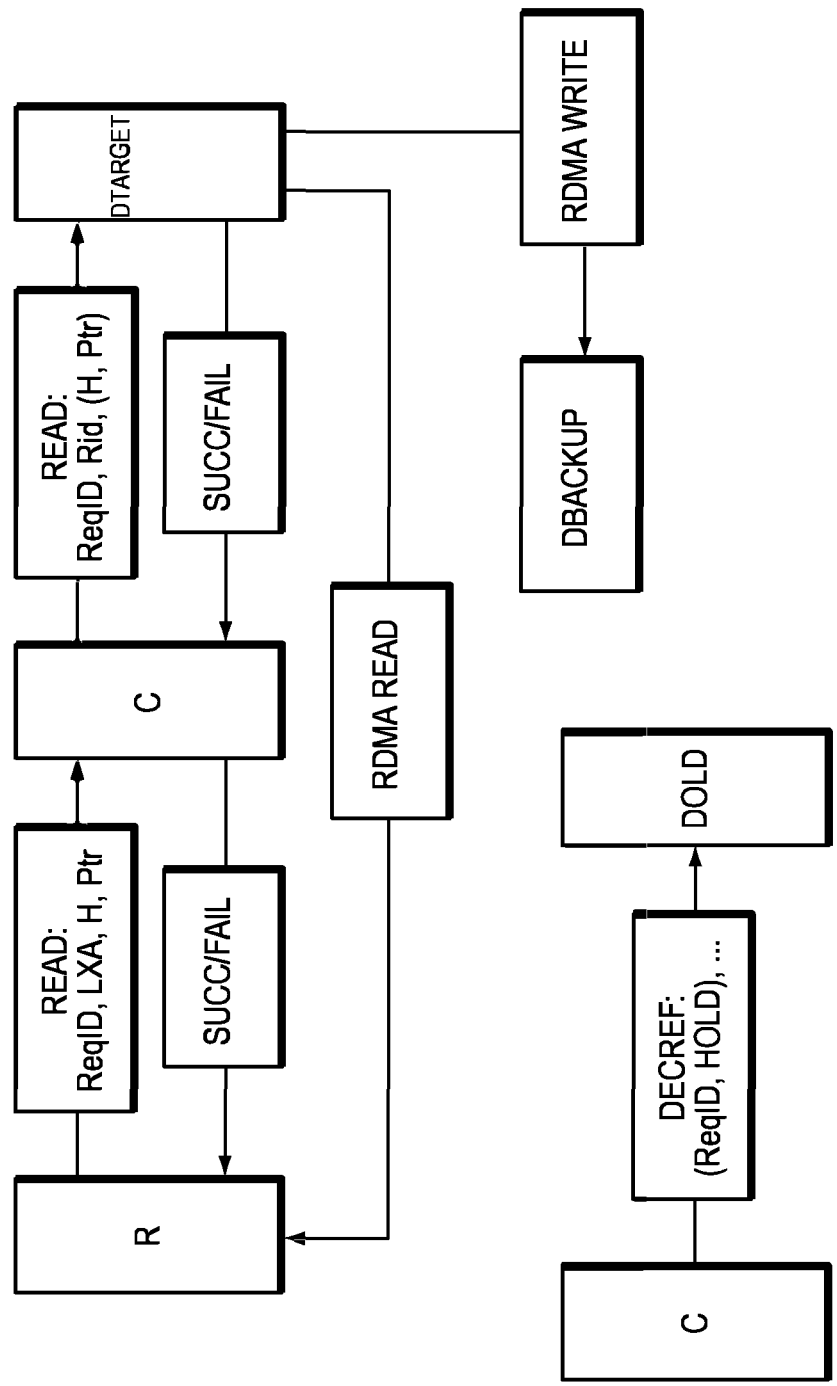
FIG. 8 is a simplified flow diagram illustrating the write procedure for a single aligned X page, in accordance with an embodiment of the present disclosure.

Reference is now made to the example embodiment of FIG. 8, which is a simplified flow diagram illustrating the write procedure for a single aligned X page according to the examples described herein.

When an R module receives a write request from the application, the R module allocates a request ID for this operation; translates the LBA to an LXA; computes a hash digest on the data to be written; consults its A->C component to determine which C module is in charge of the current LXA; and sends the designated C module a write command with parameters that include a request ID; an LXA; a hash digest; and a pointer to the buffer containing the data to be written.

The C module, when receiving the request consults its H->D component to understand which D module is in charge of the X-Page to be written ($D_{target}$); and sends $D_{target}$ a write request with parameters that include the request ID (as received from the R module); the hash digest (as received from the R module); the pointer to the data to write (as received from the R module); and the identifier of the R module.

The D module receiving the write command, $D_{target}$, may first check if it already holds an X-Page corresponding to this hash. There are two options here:

First, $D_{target}$ does not have the X-Page. In this case $D_{target}$ fetches the data from the R module using RDMA read and stores it in its memory; consults the H->D component to determine which D module is in charge of storing a backup copy of this X-Page ($D_{backup}$); performs an RDMA write of the X-Page Data to the $D_{backup}$ backup memory space; and returns success (or failure) to the C module.

Second, $D_{target}$ has the X-Page. In this case $D_{target}$ increases the reference count, returns success (or failure) to the C module.

The C module waits for a response from $D_{target}$. If a success is returned, the C module updates the A->H table to indicate that the LXA in question should point to the new hash and returns a response to the requesting R module.

If this is not a new entry in the A->H table, the C module asynchronously sends a decrease reference count command to $D_{old}$ (the D module responsible for the hash digest of the previous X-Page Data). These commands may be aggregated at the C module and sent to the D modules in batches.

The R module may answer the application once it receives a response from the C module.

Figure 9:
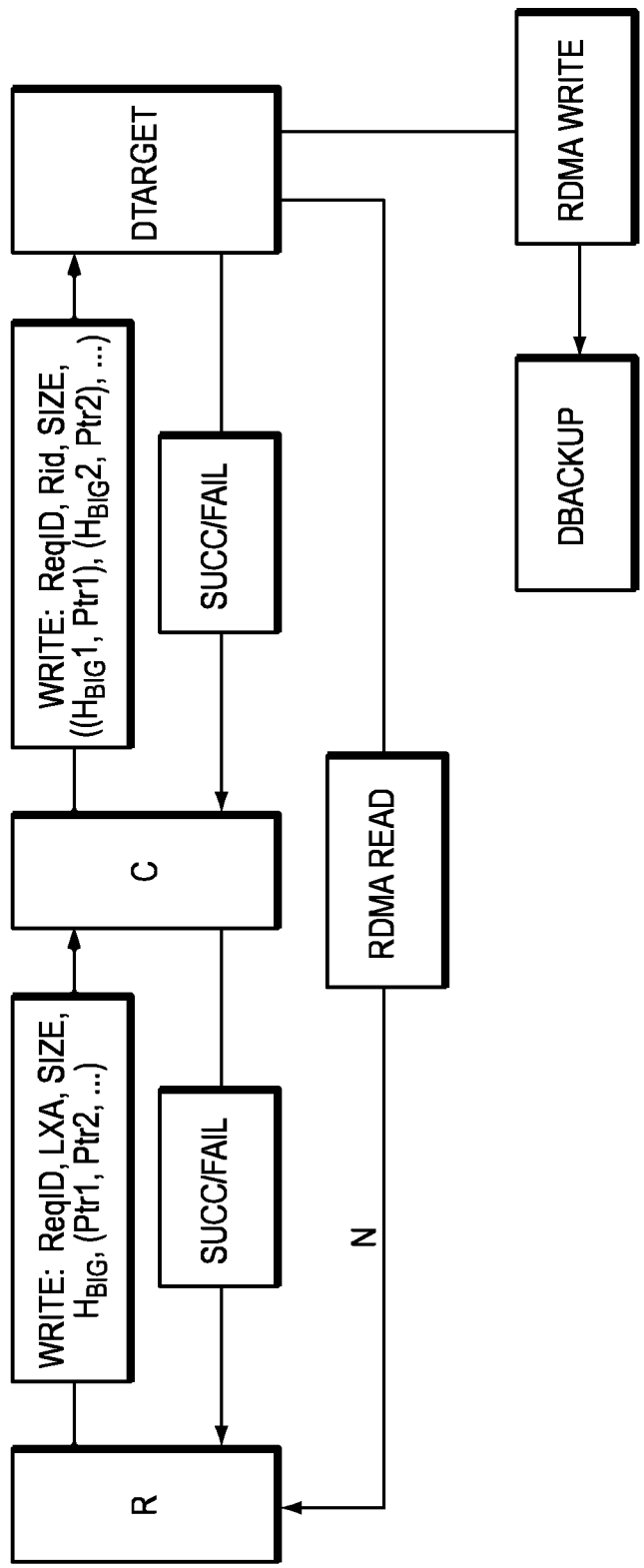
FIG. 9 is a simplified flow diagram illustrating the process for performing write operations to multiple full X-Pages, in accordance with an embodiment of the present disclosure.

Reference is now made to the example embodiment of FIG. 9, which is a flow diagram illustrating the process for writes to multiple full X-Pages.

In the case that the write request spans a range of addresses which include more than one X-Page but only one SL, the R module sends the designated C module a write command with parameters that include a request ID; a first LXA; a size of the requested write in LXAs-n; and $H_{BIG}$ which is a unique identifier of the entire chunk of data to be written. $H_{BIG}$ may be a computed hash digest and thus equal for two identical chunks of data.

Additional parameters sent with the write command are n pointers that point to the buffers which hold the data to be written.

The rest of the R module treatment is the same as for the aligned one X-Page scenario.

The C module, when receiving the request, consults its H->D component to understand which D module is in charge of $H_{BIG}$ ($D_{target}$) and generates a hash digest per pointer by replacing one byte of $H_{BIG}$ with the offset of that pointer. It is noted that this byte must not collide with the bytes used by the H->D table distribution.

It may send $D_{target}$ a write request with the parameters that include the request ID (as received from the R module); a list of respective hash-pointer pairs; and the Identifier of the R module.

The D module, when receiving the request, acts per hash-pointer pair in the same manner as described above for one X-Page. Aggregated success or error is then sent to the requesting C module.

The C module waits for a response from $D_{target}$. If the response indicates success, the C module updates its A->H table to indicate that the LXAs in question should point to the new hashes. Updating of entries in the A->H table may be done as an atomic operation, to ensure the write request is atomic. Note that all requests aligned to 4 KB (or another predefined block size) that fall within a SL may be atomic. The C module returns a response to the requesting R module. The C module adds the list of old hashes to the "decrease reference" batch if needed.

The R module answers the application once it receives a response from the C module.

In the case in which a write request spans multiple SLs, the R module splits the request and sends smaller write requests to several C modules. Each C module receives one request per SL (with a unique request ID). The flow continues as in the simpler case above, except that now the R module aggregates the responses before it answers the application.

File Based Backup

Figure 10:
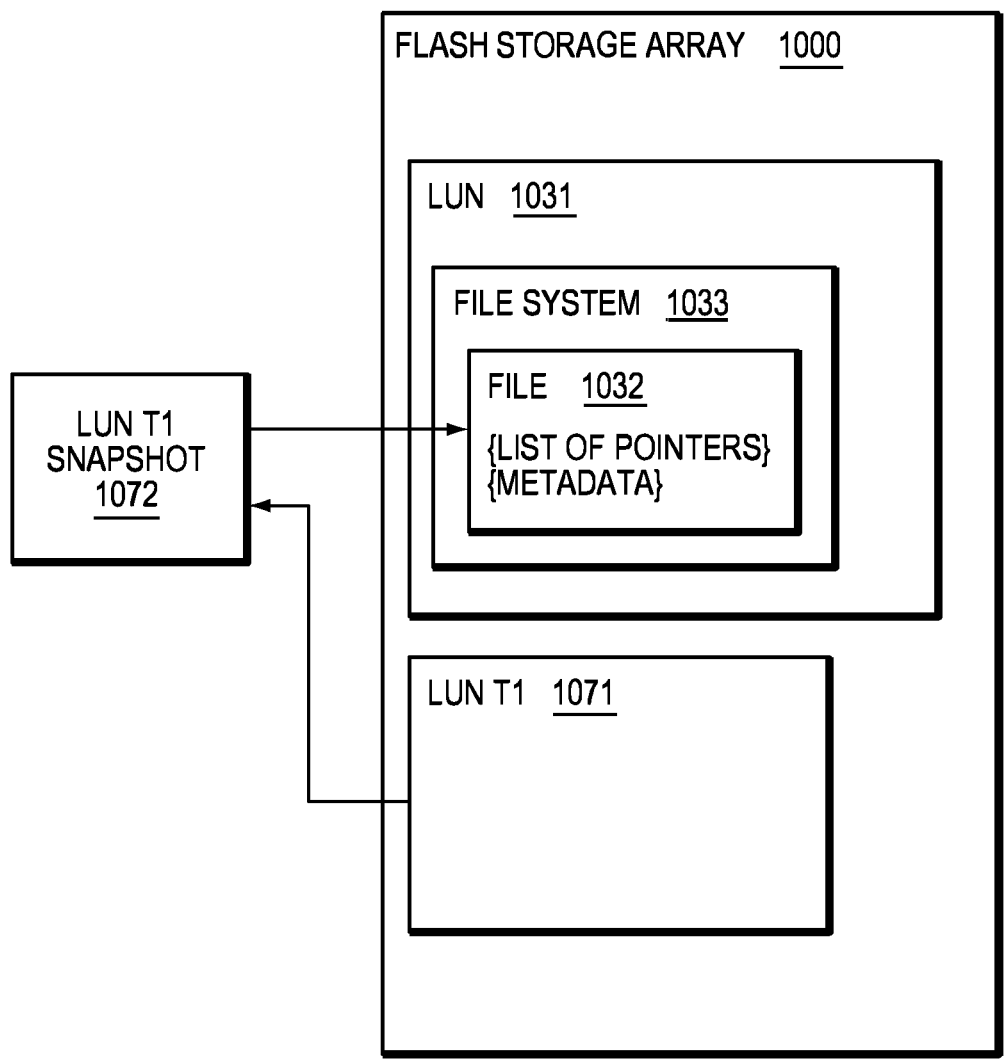
FIG. 10 is a simplified illustration of copying a snapshot into a file on a file system in a LUN, in accordance with an embodiment of the present disclosure.
Figure 11:
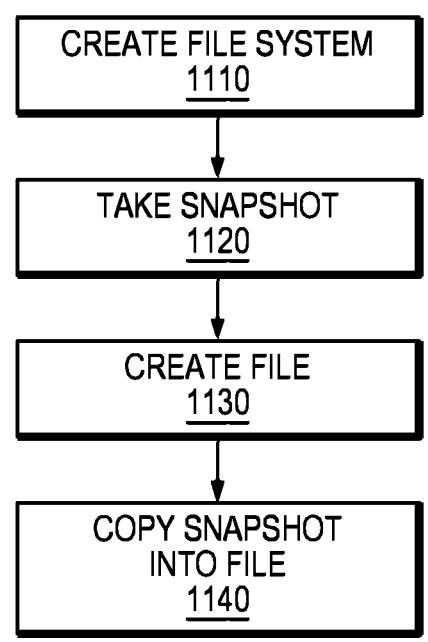
FIG. 11 is a simplified example of a method of creating a file for a back-up, in accordance with an embodiment of the present disclosure.

Refer now to the example embodiments of FIGS. 10 and 11 which illustrate creating a snapshot of a LUN. File System 1033 is created on LUN 1031 on storage array 1000 (step 1110). Snapshot 1072 of LUN 1071 at time T1 is taken (step 1120). File 1032 is created on file system 1033 on LUN 1031 (step 1130). Snapshot 107 is copied into file 1032 on File system 1033 (step 1140). Metadata in file 1032 corresponds to integrity data for the file system. In this embodiment, the integrity data is in the form a hash tree or merkle tree that describes the underlying data in hashes. Further examples of such trees may be seen in FIGS. 17 and 18.

In certain embodiments, a snapshot may be copied into a file on a file system using an xcopy command In some embodiments, if an xcopy command is used to copy a snapshot then the file may need to be at least as large as the snapshot or original LUN or LU. In an embodiment where an xcopy command is used, each address in the file may have an offset in the LUN. In many embodiments, where an xcopy command is used, each address space in the file may map to an underlying address in the LUN. In many embodiments where an xcopy command is used, the file will represent a copy of data from a LUN.

In other embodiments, a list of hashes may be copied into a file on a file system. In certain embodiments, for each hash copied into a file, a reference count to the object associated with the hash may be increased in the hash data structure of the primary storage array which may hold reference counts to the hashes. In other embodiments, for each hash copied into a file, the hash and data associated with the hash may be locked from being deleted on a storage system. In an embodiment where hashes are copied into a file, less metadata may be used on a storage system than if an xcopy command were used to copy the data into the file. In embodiments where a list of hashes are copied, the underlying data of the LUN may not be copied rather the file may contain pointers back to the underlying data in the LUN. In an embodiment where a file has hashes, the size of the file may be substantially smaller than if an xcopy command was used and data was copied into a file.

Figure 12:
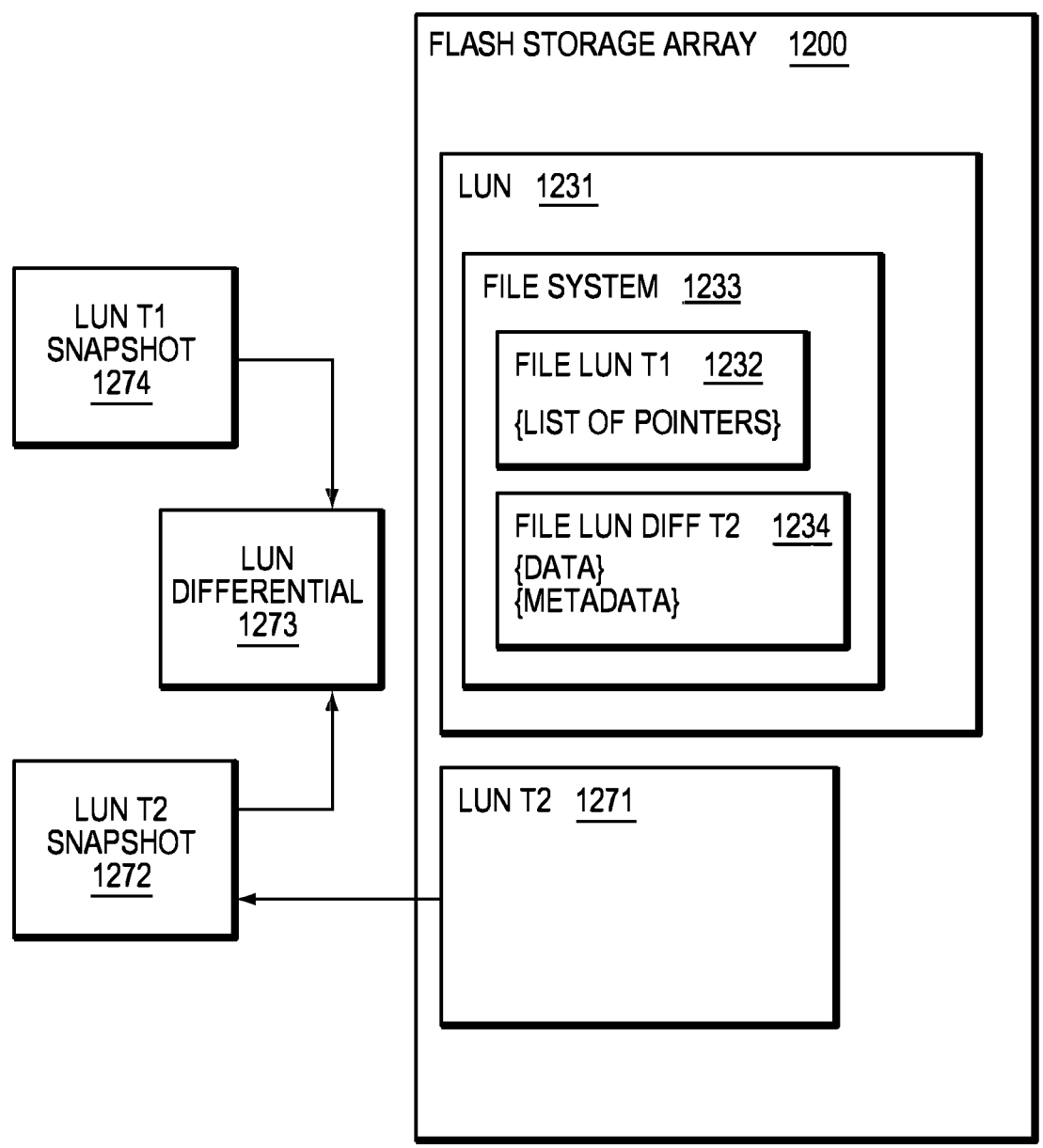
FIG. 12 is a simplified illustration of copying a snapshot differential into a file on a file system in a LUN, in accordance with an embodiment of the present disclosure.
Figure 13:
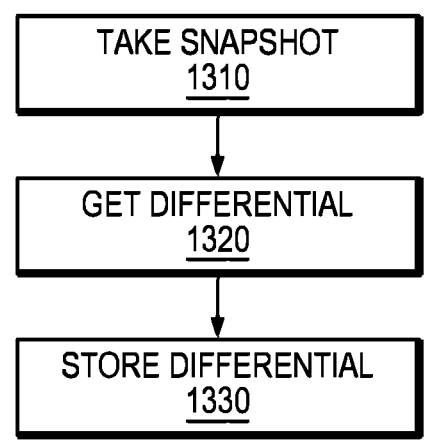
FIG. 13 is a simplified example of a method of creating a differential for a back-up, in accordance with an embodiment of the present disclosure.

Refer now to the example embodiments of FIGS. 12 and 13 which illustrate recording a differential snapshot at time T2. Snapshot 1272 is taken of LUN 1271 at time T2 (step 1310). Differential 1273 is created between snapshot 1274 at TI and snapshot 1272 at T2 (step 1320). Differential 1273 is stored in file 1234 on file system 1233 (step 1330).

In certain embodiments, differences between two snapshots may be xcopied into a file. In some embodiments, hashes corresponding to differences between two snapshots may be copied into a file. In most embodiments, a series, of differences may correspond to a series of accessible points in time. In certain embodiments, access to a point in time may be quick as the differences and files may contain pointers to data on a LUN.

Figure 14:
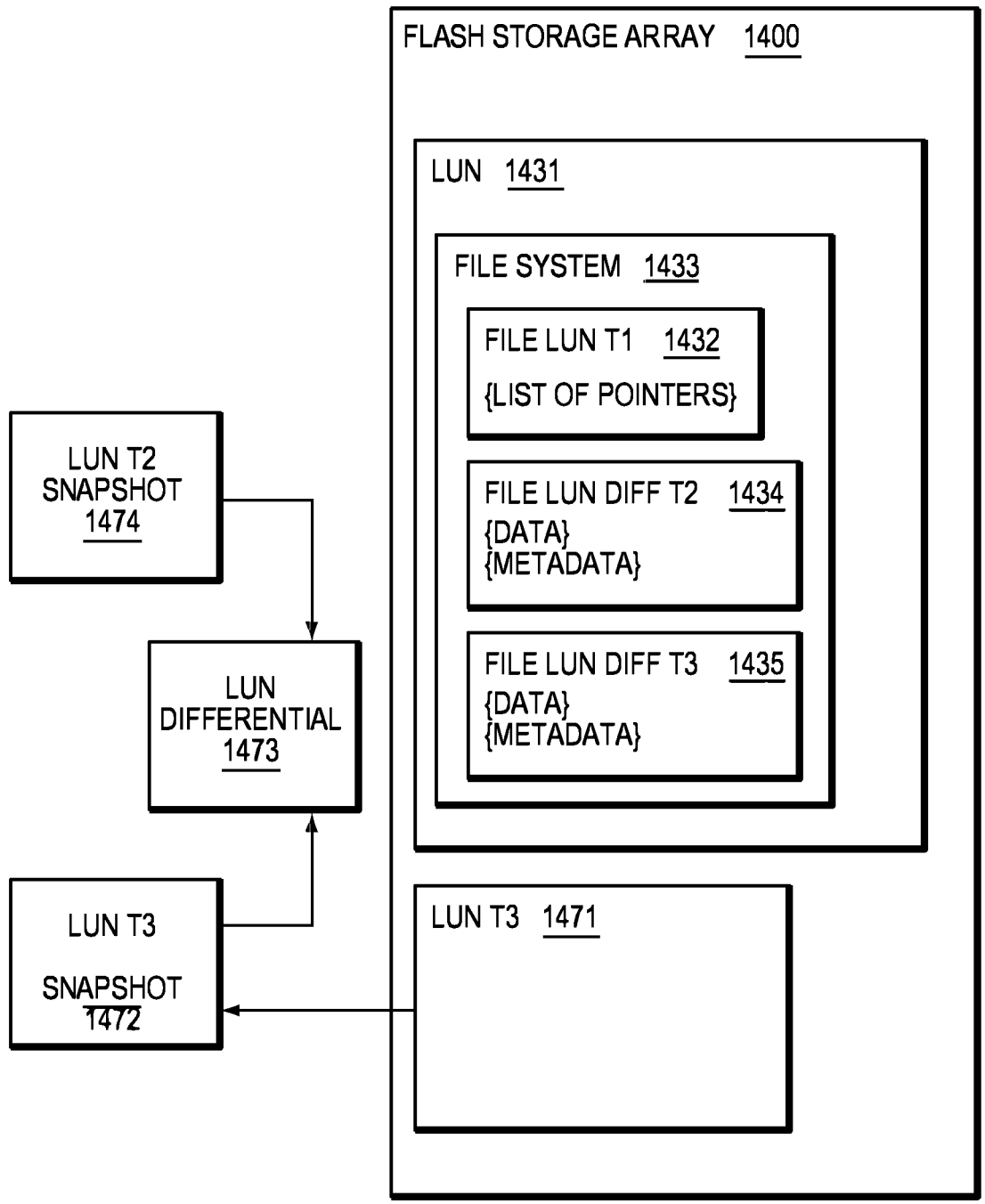
FIG. 14 is an alternative simplified illustration of copying a snapshot differential into a file on a file system in a LUN, in accordance with an embodiment of the present disclosure.

Refer now to the example embodiments of FIGS. 13 and 14 which illustrate recording a differential snapshot at time T3. Snapshot 1472 is taken of LUN 1471 at time T3 (step 1310). Differential 1473 is created between snapshot 1474 at T2 and snapshot 1472 at T3 (step 1320). Differential 1473 is stored in file 1435 on file system 1433 (step 1330).

Figure 15:
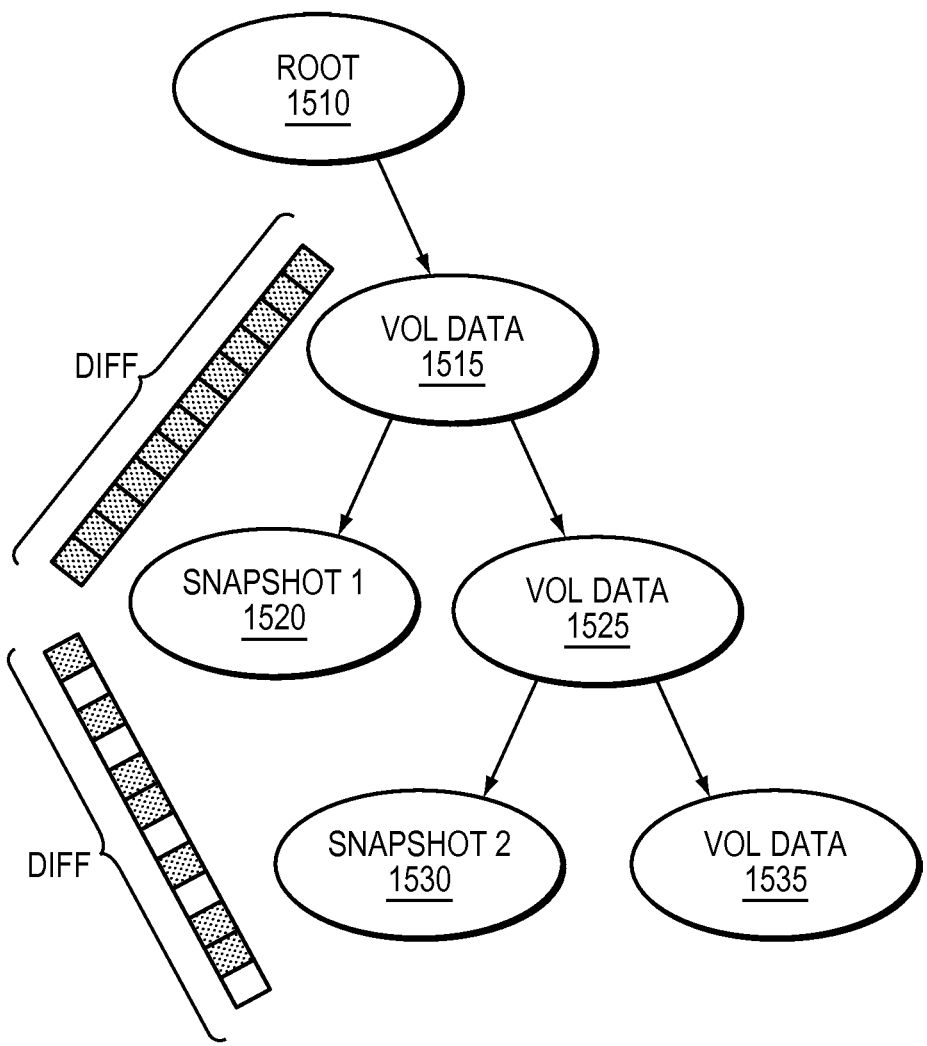
FIG. 15 is a simplified illustration of tree with snapshot data and a difference data, in accordance with an embodiment of the present disclosure.

Refer now to the example embodiment of FIG. 15 which represents differential between snapshots. Root 1510 represents the root of a tree. Volume data 1515 represents a snapshot or initial set of data. Snapshot 1 1520 represents differences between volume data 1515 at a first time and the snapshot at a second time. Volume data 1525 represents the data that changed between volume data 1515 and snapshot 1 1520 at the second time. Snapshot 2 1530 represents the volume at a third time. Volume data 1535 represents the changes between snapshot 1 1520 and snapshot 2 1530.

Figure 16:
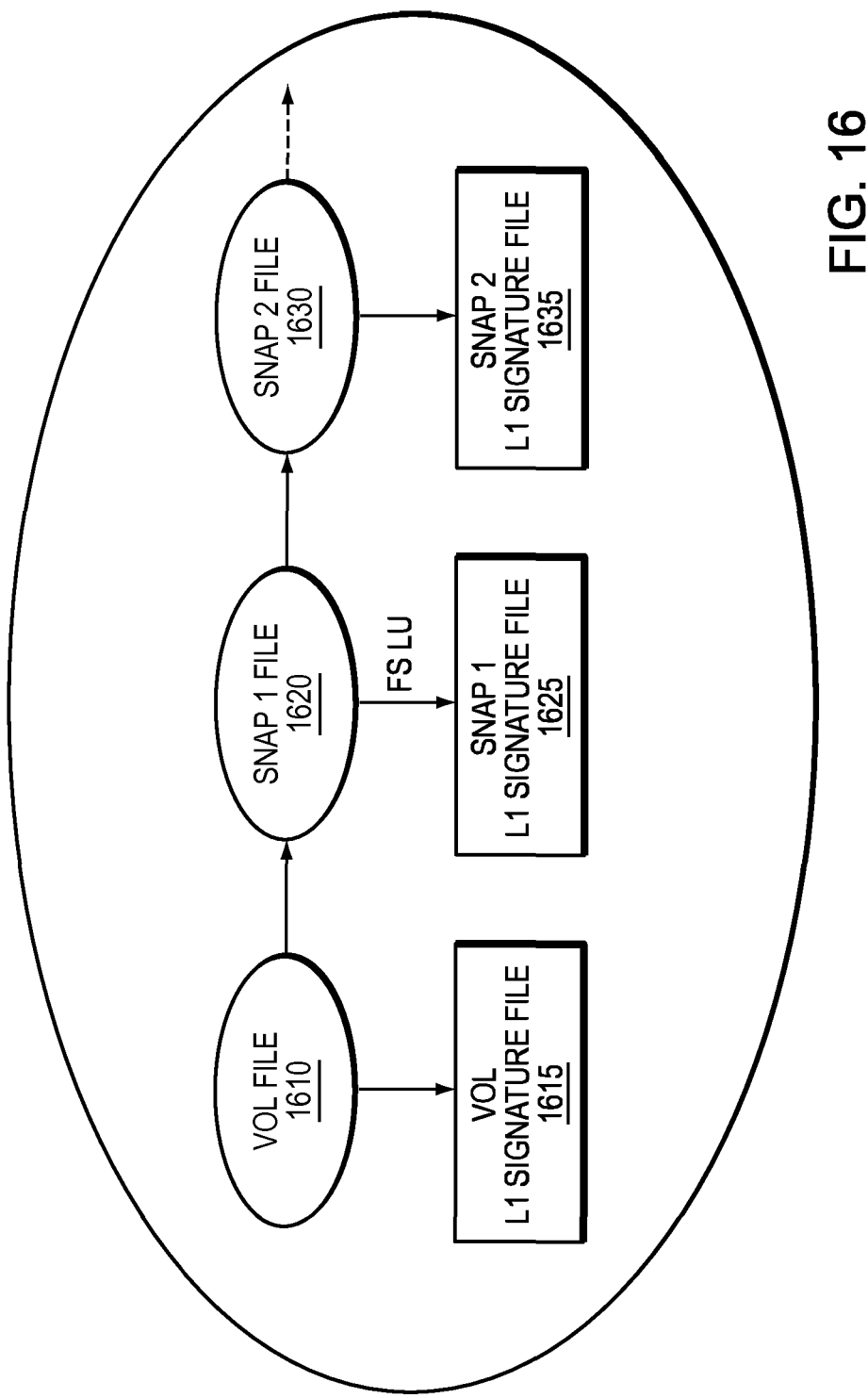
FIG. 16 is a simplified illustration back-ups with verification signatures, in accordance with an embodiment of the present disclosure.

Refer now to the example embodiment of FIG. 16, which illustrates a signature file for each volume and snapshot. Volume file 1610 has volume L1 signature file 1615 created for it. Snap 1 file 1620 has snap 1 L1 signature file 1625 created for it. Snap 2 file 1630 has snap 2 L1 signature file 1635 created for it. Each signature file represents hashes that correspond to the associated data in the file to which the hash corresponds. In this embodiment, each signature 1 represents the data within the volume or snapshot. In many embodiments, the signatures may be accessed from the underlying deduplicated storage. In this embodiment, it may be possible to determine the differences between the volumes by comparing the differences between the signatures.

Figure 17:
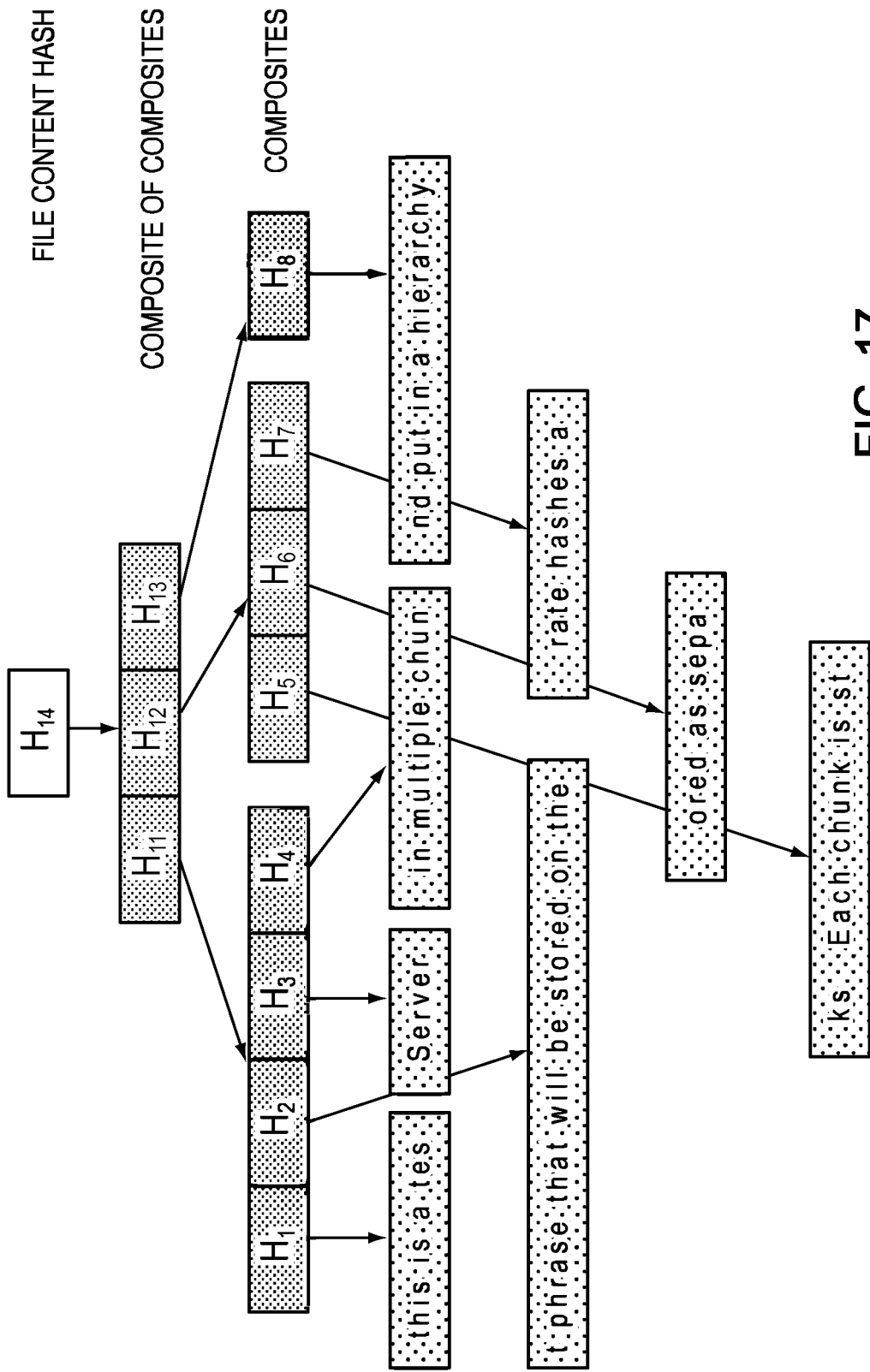
FIG. 17 is a simplified illustration of a hash tree, in accordance with an embodiment of the present disclosure.
Figure 18:
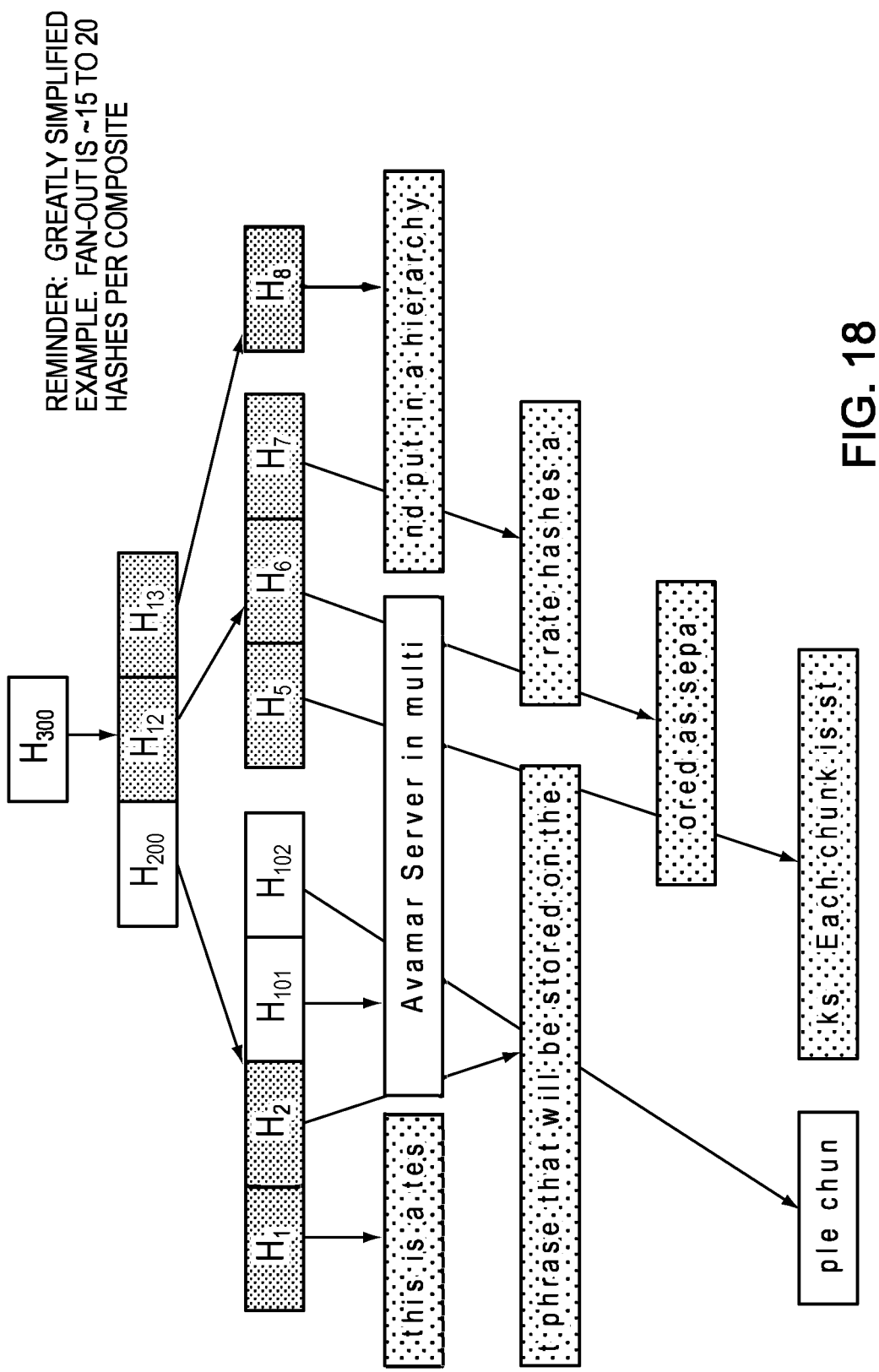
FIG. 18 is an alternative simplified illustration of a hash tree, in accordance with an embodiment of the present disclosure.

Refer now to the example embodiments of FIGS. 17 and 18, which illustrate how hashes may be generated and change as underlying data changes, where the hashes are represented in merkle tress. In FIG. 17, hash H14 represents a file content hash for each of the composite hashes for the underlying data. In FIG. 18, some of the underlying data has changes, which has resulted in some of the composite hashes changing as well as the content hash to be H300. FIGS. 17 and 18 are example embodiments of signature files and represent sample embodiments of the signature files of FIG. 16. In these embodiments, there are variable length hashes that represent how a hash changes based on changes to the data.

Figure 19:
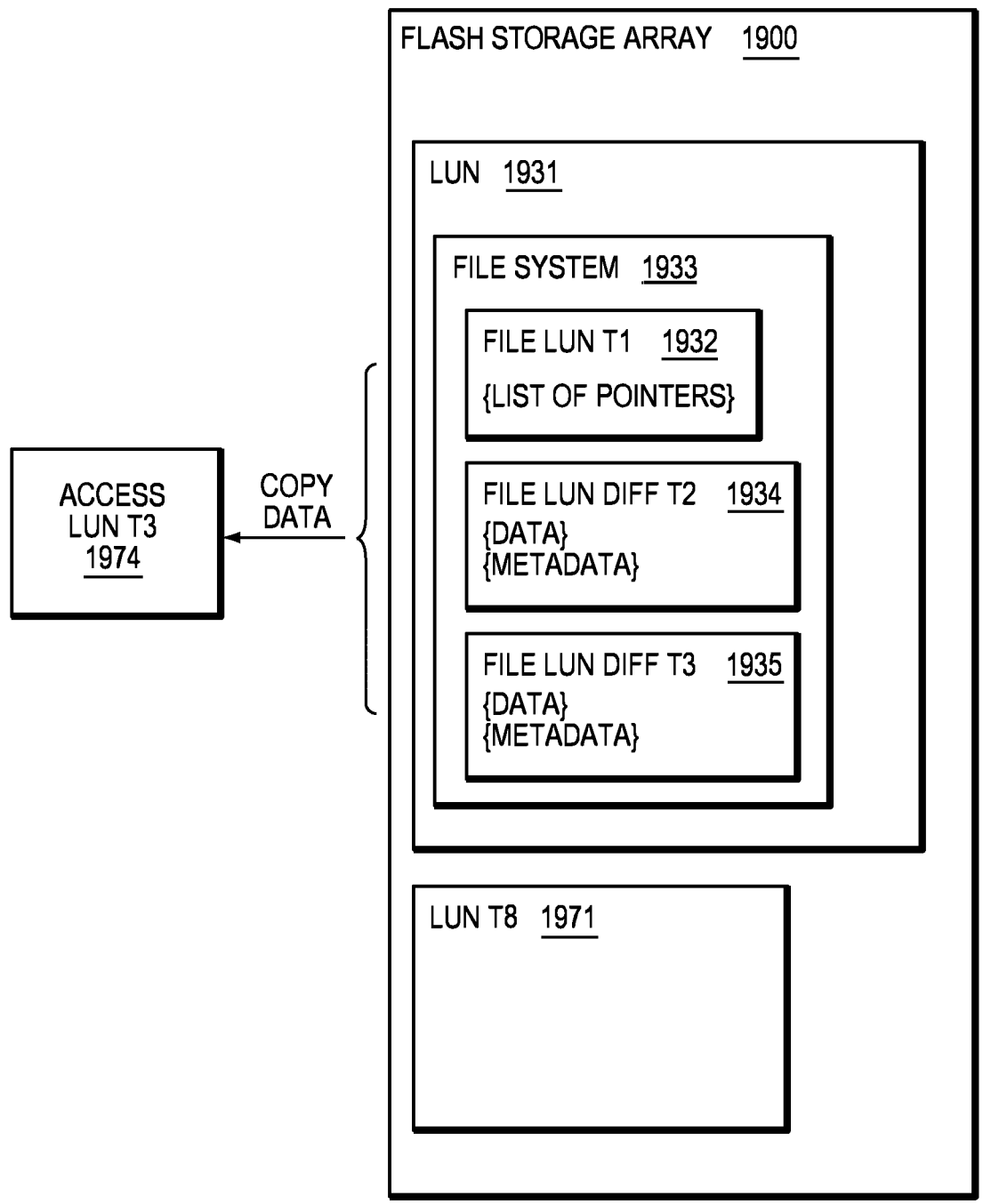
FIG. 19 is a simplified illustration of a accessing a back-up from a file in a file system, in accordance with an embodiment of the present disclosure.
Figure 20:
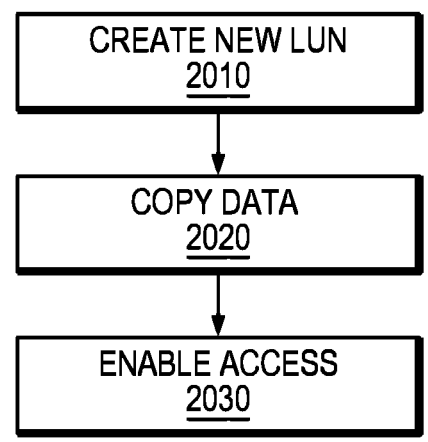
FIG. 20 is a simplified example of a method of accessing a back-up from a file, in accordance with an embodiment of the present disclosure.

Refer now to the example embodiments of FIGS. 19 and 20 which represent accessing a LUN stored in a file in a file system. LUN 1974 is created for access to a LUN at time 3 (step 2010). The data in Files 1932, 1934, and 1935 is xcopied into LUN 1974 (step 2020). Access to LUN 1974 is enabled (step 2030).

Figure 21:
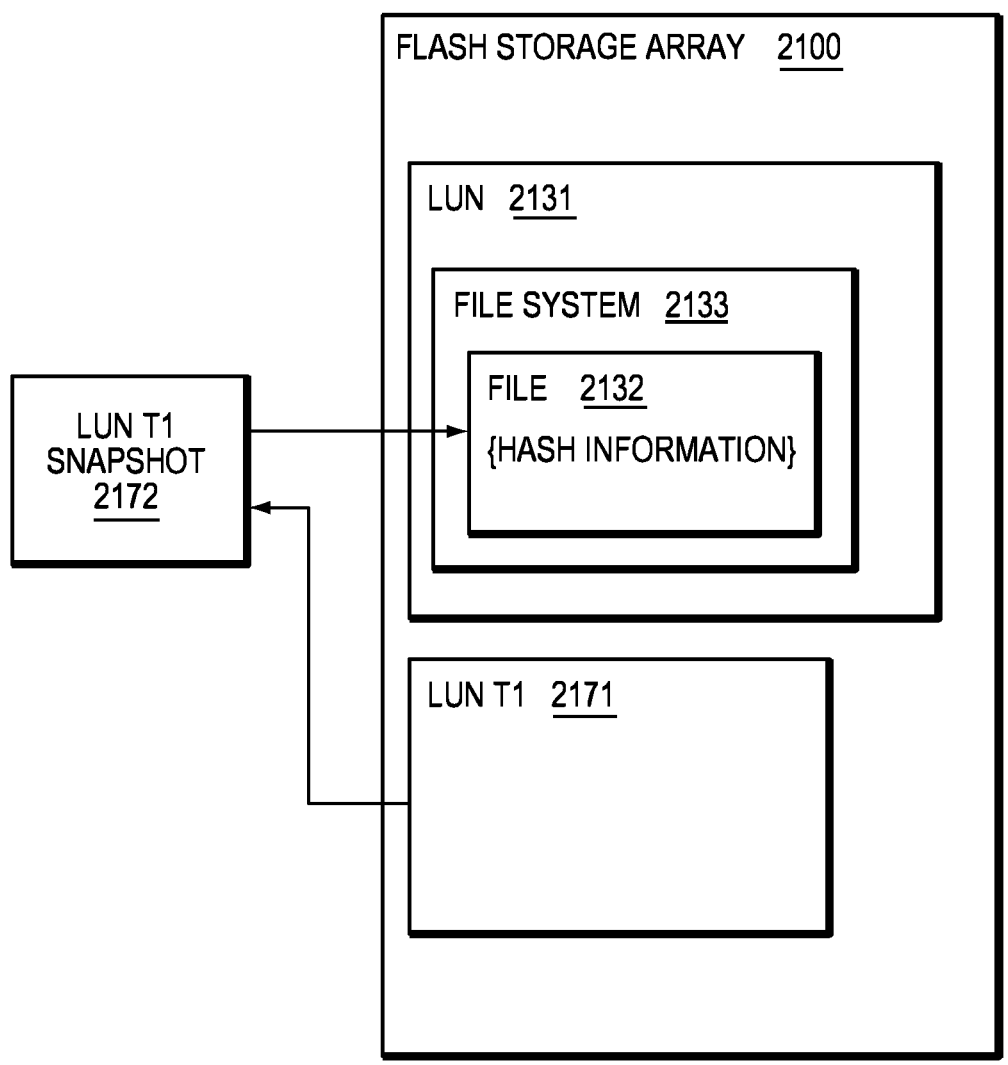
FIG. 21 is an alternative simplified illustration of copying a snapshot into a file on a file system in a LUN, in accordance with an embodiment of the present disclosure.
Figure 22:
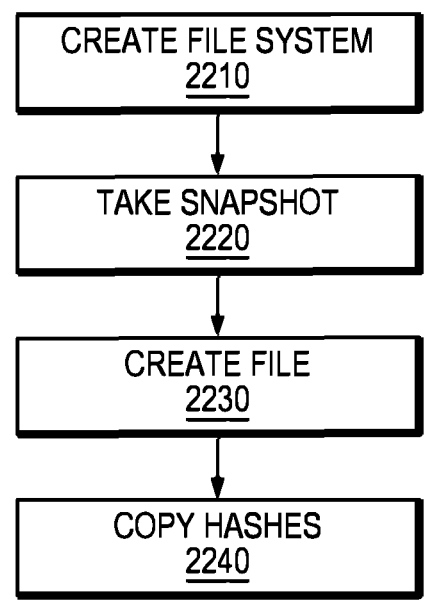
FIG. 22 is an alternative simplified example of a method of creating a file for a back-up, in accordance with an embodiment of the present disclosure.

Refer now to the example embodiments of FIGS. 21 and 22, which represent an alternative embodiment of storing snapshot information in a file system using hashes. File system 2133 is created on LUN 2131 in storage array 2100 (step 2210). Snapshot 2172 at T1 is taken (step 2220). File 2132 is created (Step 2230). Hashes are copied from snapshot to file 2132 (step 2240). In these embodiments, File 2132 does not need to be as a large as LUN 2171, rather File 2132 merely holds hashes corresponding to the data in LUN 2171. In this embodiment, this may reduce the size of file 2132 by a factor of 25. As well in this embodiment, the object counter referencing the data associated with the hashes corresponding to the data on LUN 2171 is either incremented or the hash is locked to not be deleted. In some embodiments, the hashes may not be kept in a single file but rather in a merkle tree as described in FIGS. 17, 18, so that consecutive copies of the hash file may be stored much more efficiently.

Figure 23:
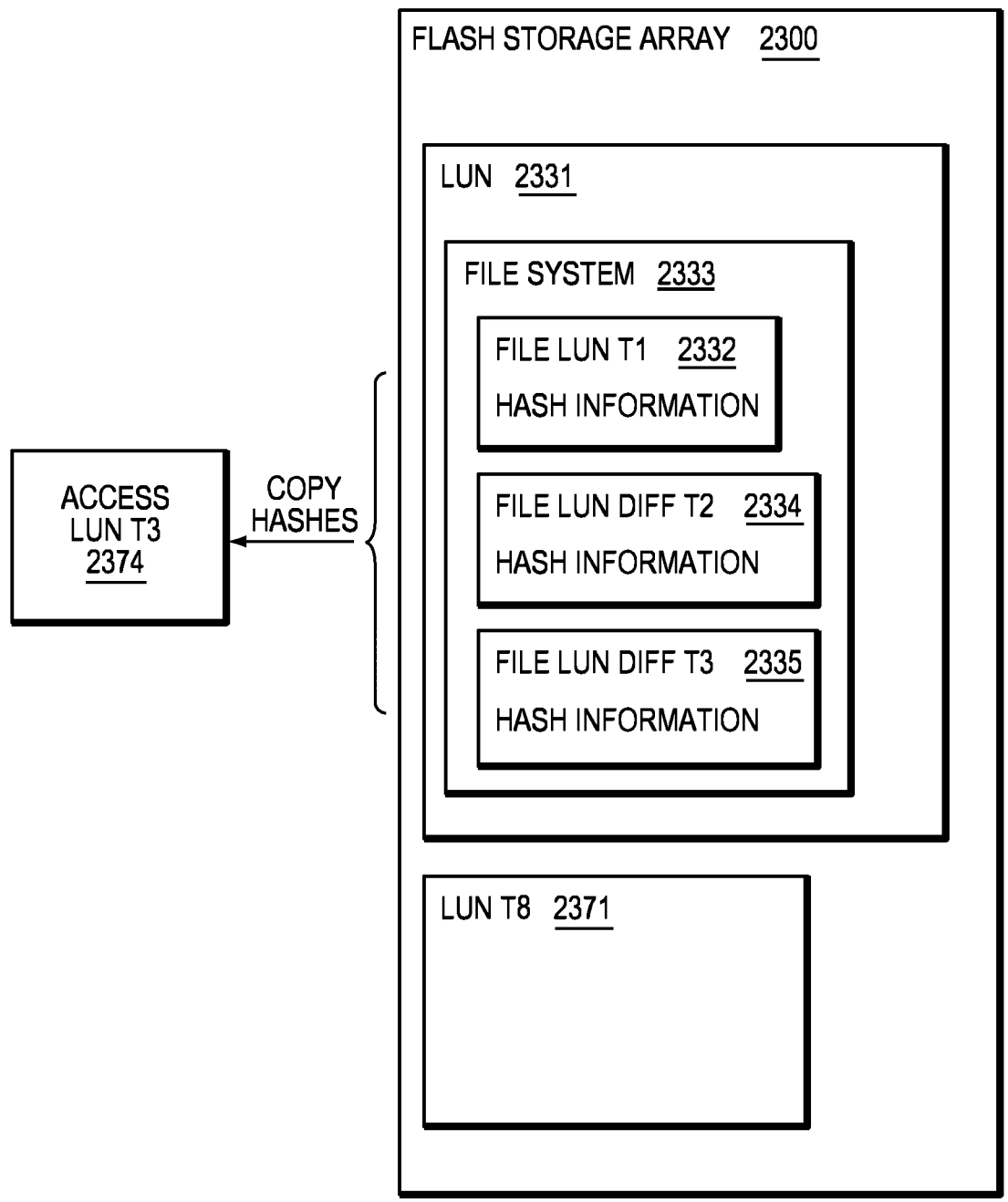
FIG. 23 is an alternative simplified illustration of a accessing a back-up from a file in a file system, in accordance with an embodiment of the present disclosure.
Figure 24:
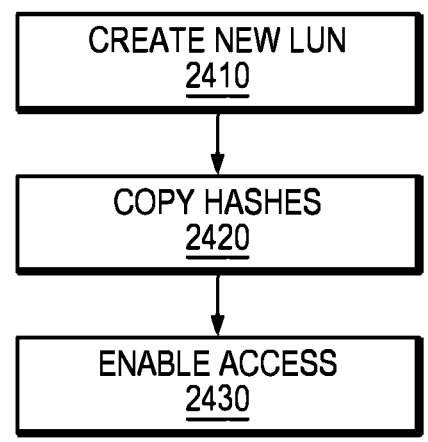
FIG. 24 is an alternative simplified example of a method of accessing a back-up from a file, in accordance with an embodiment of the present disclosure.

Refer now to the example embodiments of FIGS. 23 and 24 which illustrate accessing a point in time. LUN 2374 is created (step 2410). Hashes are copied in LUN 2374 (step 2420). Access to LUN 2374 is enabled (step 2430). In these embodiments, the hash information for the point in time at T3 is copied into LUN 2374. In certain embodiments, building a LUN from hashes may use internal storage commands to populate the LUN based on the hashes.

Figure 25:
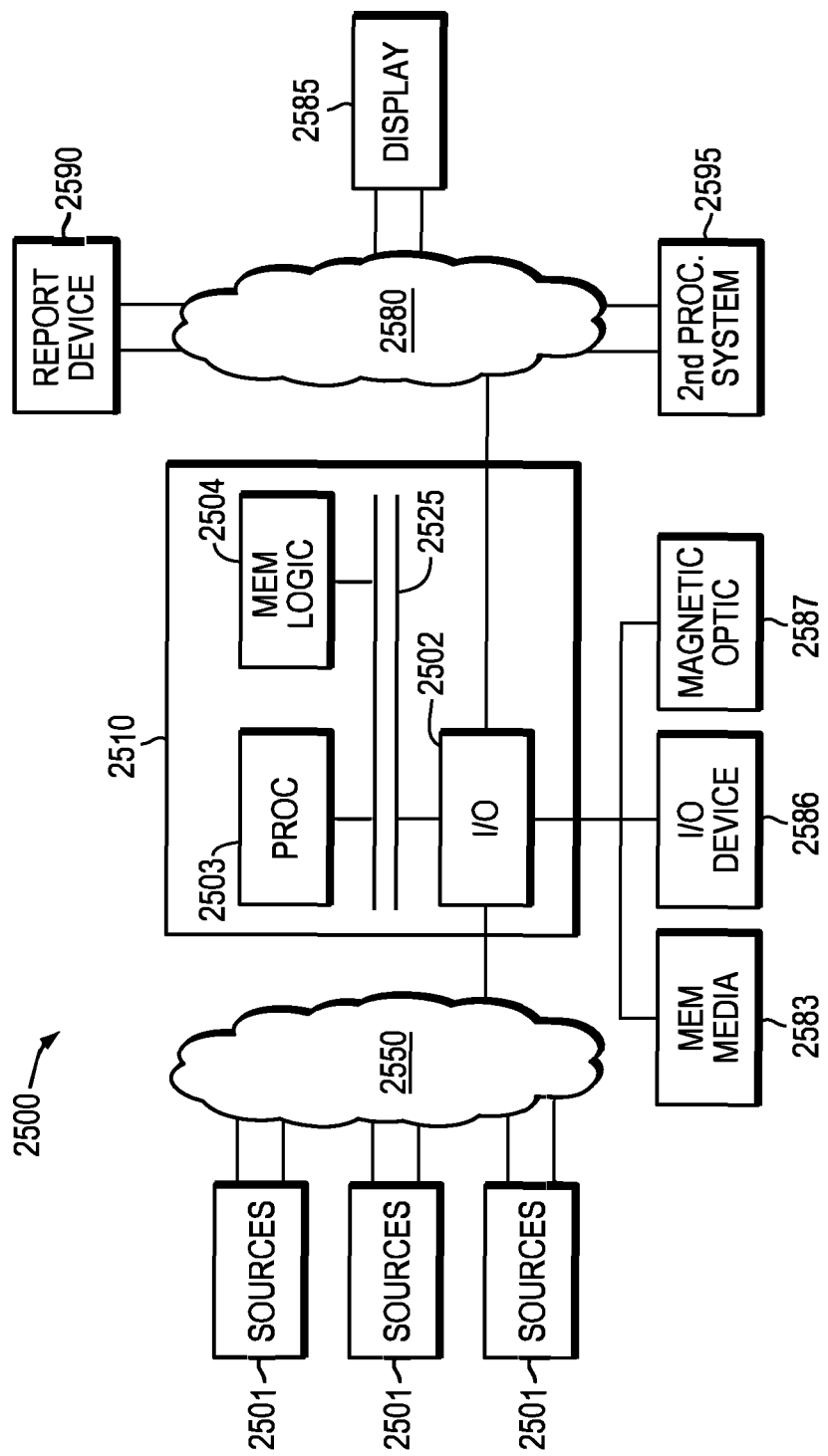
FIG. 25 is an example of an embodiment of an apparatus that may utilize the techniques described, herein, in accordance with an embodiment of the present disclosure.
Figure 26:
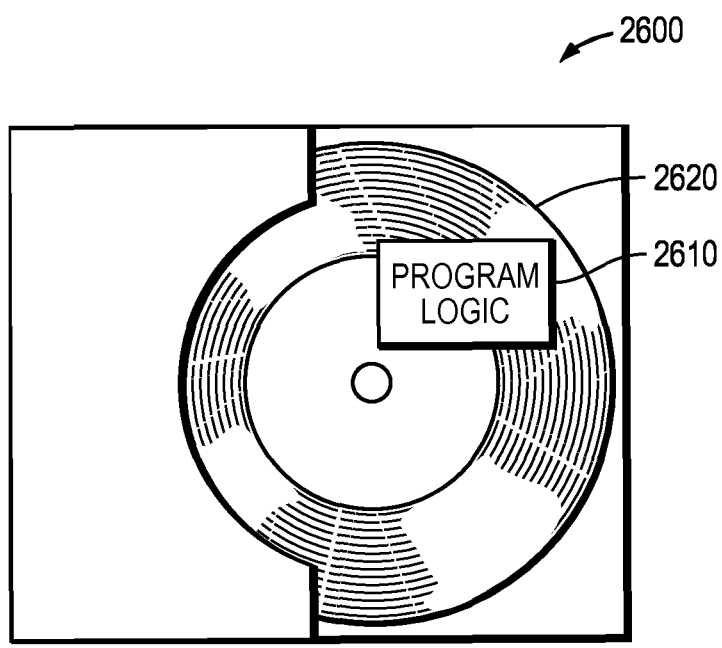
FIG. 26 is an example of an embodiment of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 25, the machine becomes an apparatus for practicing the invention. When implemented on one or more general-purpose processors, the program code combines with such a processor 2503 to provide a unique apparatus that operates analogously to specific logic circuits. As such a general purpose digital machine can be transformed into a special purpose digital machine. FIG. 26 shows Program Logic 2610 embodied on a computer-readable medium 2620 as shown, and wherein the Logic is encoded in computer-executable code configured for carrying out the reservation service process of this invention and thereby forming a Computer Program Product 2600. The logic 2610 may be the same logic 2540 on memory 2504 loaded on processor 2503. The program logic may also be embodied in software modules, as modules, or as hardware modules.

The logic for carrying out the method may be embodied as part of the system described below, which is useful for carrying out a method described with reference to embodiments shown in, for example, FIGS. 11, 13, and 20. For purposes of illustrating the present invention, the invention is described as embodied in a specific configuration and using special logical arrangements, but one skilled in the art will appreciate that the device is not limited to the specific configuration but rather only by the claims included with this specification. A processor may be a physical or virtual processor.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

The processes described herein (e.g., processes 700, 800 and 900) are not limited to use with the hardware and software of FIG. 14; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that, each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 700, 800 and 900 are not limited to the specific processing order of FIGS. 11 to 13, respectively. Rather, any of the processing blocks of FIGS. 11 to 13 may be re-ordered, combined or removed, performed in parallel or in serial, as necessary, to achieve the results set forth above.

The processing blocks (for example, in the processes 700, 800 and 900) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

For purposes of illustrating the present invention, the invention is described as embodied in a specific configuration and using special logical arrangements, but one skilled in the art will appreciate that the device is not limited to the specific configuration but rather only by the claims included with this specification. A processor may be a physical or virtual processor.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method, implemented by at least one computing device, comprising:
    creating a file system on a first logical unit (LU) of a storage array;
    taking a first snapshot of a second LU at a first point in time, stored on the storage array;
    creating a first file in the file system;
    copying the first snapshot of the second LU into the first file by copying hashes corresponding to data of the second LU into the first file;
    taking a second snapshot of the second LU at a second point in time;
    determining differences between the first snapshot at the first point in time and the second snapshot at the second point in time;
    creating a second file in the file system;
    copying the differences into the second file;
    creating an access LU;
    copying data in the first file and the second file into the access LU; and
    enabling access to the access LU to access the second LU at the second point in time.

2. The method of claim 1, further comprising:
    creating a Merkle tree wherein the hashes corresponding to the data of the second LU are stored in the Merkle tree;
    wherein the Merkle tree enables determining consistency of the data of the second LU based on the corresponding hashes.

3. The method of claim 1, wherein the copying of the differences into the second file comprises xcopying the differences.

4. The method of claim 1, wherein the copying of the data comprises xcopying the data in the first file and the second file into the access LU.

5. The method of claim 1, wherein the copying of the differences into the second file comprises copying hashes corresponding to the differences.

6. The method of claim 1, wherein the copying of data comprises copying hashes corresponding to the data in the first file and the second file into the access LU.

7. The method of claim 1, wherein the copying of the hashes corresponding to the data of the second LU into the first file comprises increasing a reference count to an object associated with each of the hashes.

8. A computer program product comprising:
 a non-transitory computer readable medium encoded with computer executable program code which enables execution across one or more processors to implement:
  creating a file system on a first logical unit (LU) of a storage array;
  taking a first snapshot of a second LU at a first point in time, stored on the storage array;
  creating a first file in the file system;
  copying the first snapshot of the second LU into the first file by copying hashes corresponding to data of the second LU into the first file;
  taking a second snapshot of the second LU at a second point in time;
  determining differences between the first snapshot at the first point in time and the second snapshot at the second point in time;
  creating a second file in the file system;
  copying the differences into the second file;
  creating an access LU;
  copying data in the first file and the second file into the access LU; and
  enabling access to the access LU to access the second LU at the second point in time.

9. The computer product of claim 8, further comprising:
 creating a Merkle tree wherein the hashes corresponding to the data of the second LU are stored in the Merkle tree;
 wherein the Merkle tree enables determining consistency of the data of the second LU based on the corresponding hashes.

10. The computer product of claim 8, wherein the copying of the differences into the second file comprises xcopying the differences.

11. The computer product of claim 8, wherein the copying of the data comprises xcopying the data in the first file and the second file into the access LU.

12. The computer product of claim 8, wherein the copying of the differences into the second file comprises copying hashes corresponding to the differences.

13. The computer product of claim 8, wherein the copying of the data comprises copying hashes corresponding to the data in the first file and the second file into the access LU.

14. The computer product of claim 8, wherein the copying of the hashes corresponding to the data of the second LU into the first file comprises increasing a reference count to an object associated with each of the hashes.

15. A system comprising:
 a memory and one or more processors implemented at least partially by hardware;
 a storage array;
 a first logical unit (LU) stored on the storage array;
 a second LU stored on the storage array; and
 computer-executable logic operating in memory, wherein the computer-executable program logic is configured to enable execution across one or more processors to implement:
  creating a file system on the first LU of the storage array;
  taking a first snapshot of the second LU at a first point in time, stored on the storage array;
  creating a first file in the file system;
  copying the first snapshot of the second LU into the first file by copying hashes corresponding to data of the second LU into the first file;
  taking a second snapshot of the second LU at a second point in time;
  determining differences between the first snapshot at the first point in time and the second snapshot at the second point in time;
  creating a second file in the file system;
  copying the differences into the second file;
  creating an access LU;
  copying data in the first file and the second file into the access LU; and
  enabling access to the access LU to access the second LU at the second point in time.

16. The system of claim 15, further comprising:
 creating a Merkle tree wherein the hashes corresponding to the data of the second LU are stored in the Merkle tree;
 wherein the Merkle tree enables determining consistency of the data of the second LU based on the corresponding hashes.

17. The system of claim 15, wherein the copying of the differences into the second file comprises copying hashes corresponding to the differences.

18. The system of claim 15, wherein the copying of the data comprises copying hashes corresponding to the data in the first file and the second file into the access LU.

19. The system of claim 18, wherein the copying of the hashes corresponding to the data in the first file and the second file into the access LU comprises increasing a reference count to an object associated with each of the hashes.

20. The system of claim 15, wherein the copying of the hashes corresponding to the data of the second LU into the first file comprises increasing a reference count to an object associated with each of the hashes.

* * * * *